(12) United States Patent
Chen et al.

(10) Patent No.: US 6,713,152 B2
(45) Date of Patent: Mar. 30, 2004

(54) FINS AND PROFILES FOR PLASTIC BAGS

(75) Inventors: Paul N. Chen, Canandaigua, NY (US); Steven P. Long, Canandaigua, NY (US); Thomas A. White, Farmington, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/948,865

(22) Filed: Sep. 7, 2001

(65) Prior Publication Data
US 2003/0118758 A1 Jun. 26, 2003

(51) Int. Cl.⁷ .................................................. B32B 3/06
(52) U.S. Cl. ........................ 428/99; 428/100; 428/352; 383/63; 383/64; 383/65
(58) Field of Search .................... 428/35.2, 99, 100; 383/63, 64, 65

(56) References Cited

U.S. PATENT DOCUMENTS

| | | |
|---|---|---|
| 1,785,234 A | 12/1930 | Sundback |
| 1,992,152 A | 2/1935 | Yeates |
| 2,091,617 A | 8/1937 | Sundback |
| 2,506,311 A | 5/1950 | Moore |
| 2,560,535 A | 7/1951 | Allen |
| 2,779,385 A | 1/1957 | Carlzen et al. |
| 2,978,769 A | 4/1961 | Harrah |
| 3,104,798 A | 9/1963 | Stone |
| 3,149,927 A | 9/1964 | Fady |
| 3,172,443 A | 3/1965 | Ausnit |
| 3,181,583 A | 5/1965 | Lingenfelter |
| 3,198,228 A | 8/1965 | Naito |
| 3,225,429 A | 12/1965 | Fady |
| 3,259,951 A | 7/1966 | Zimmerman |
| 3,282,493 A | 11/1966 | Kamins et al. |
| 3,313,471 A | 4/1967 | Dickard et al. |
| 3,325,084 A | 6/1967 | Ausnit |
| 3,326,399 A | 6/1967 | Ausnit |
| 3,381,592 A | 5/1968 | Ravel |
| 3,387,640 A | 6/1968 | Butler |
| 3,394,798 A | 7/1968 | Sako |
| 3,426,396 A | 2/1969 | LaGuerre |
| 3,456,867 A | 7/1969 | Repko |
| 3,462,068 A | 8/1969 | Suominen |
| 3,471,005 A | 10/1969 | Sexstone |
| 3,473,589 A | 10/1969 | Gotz |

(List continued on next page.)

FOREIGN PATENT DOCUMENTS

| | | |
|---|---|---|
| EP | 0 016 601 A1 | 10/1980 |
| EP | 0 239 319 B1 | 3/1987 |
| EP | 0 371 402 B1 | 6/1990 |

(List continued on next page.)

OTHER PUBLICATIONS

Document entitled Topas® COC's for Packaging Prepared for Tenneco Corporation by Dr. Ronald Lamonte dated Oct. 15, 1999, 11 pages.

(List continued on next page.)

Primary Examiner—Harold Pyon
Assistant Examiner—Jane Rhee
(74) Attorney, Agent, or Firm—Jenkens & Gilchrist

(57) ABSTRACT

A fastener for a plastic bag comprising a male track including a male profile and an optional first fin extending from the male profile and a female track including a female profile and an optional second fin extending from the female profile. At least one of the first and second fins and/or one of the male and female profiles comprises a cyclic olefin copolymer or a combination of a cyclic olefin copolymer and one or more additional polymers. The cyclic olefin copolymer has a glass transition temperature, $T_g$, of greater than about 20° C. as determined by ASTM D3418. The cyclic olefin copolymer may comprise from about 10 to about 90 mol. % norbornene. The additional polymer is selected from a polyolefinic resin, an engineering resin, and a combination thereof.

119 Claims, 7 Drawing Sheets

U.S. PATENT DOCUMENTS

| | | |
|---|---|---|
| 3,532,571 A | 10/1970 | Ausnit |
| RE27,174 E | 9/1971 | Ausnit |
| 3,608,439 A | 9/1971 | Ausnit |
| 3,613,524 A | 10/1971 | Behr |
| 3,633,642 A | 1/1972 | Siegel |
| 3,644,981 A | 2/1972 | Gustavsson |
| 3,701,191 A | 10/1972 | Laguerre |
| 3,701,192 A | 10/1972 | Laguerre |
| 3,746,215 A | 7/1973 | Ausnit et al. |
| 3,780,781 A | 12/1973 | Uramoto |
| 3,785,111 A | 1/1974 | Pike |
| 3,790,992 A | 2/1974 | Herz |
| 3,839,128 A | 10/1974 | Arai |
| 3,849,843 A | 11/1974 | Alberts |
| 3,868,891 A | 3/1975 | Parish |
| 3,948,705 A | 4/1976 | Ausnit |
| 3,962,007 A | 6/1976 | Heimberger |
| 3,991,801 A | 11/1976 | Ausnit |
| 4,094,729 A | 6/1978 | Boccia |
| 4,101,355 A | 7/1978 | Ausnit |
| 4,122,594 A | 10/1978 | Azzara |
| 4,173,283 A | 11/1979 | Takamatsu |
| 4,191,230 A | 3/1980 | Ausnit |
| 4,196,030 A | 4/1980 | Ausnit |
| 4,232,429 A | 11/1980 | Friedberg |
| 4,235,653 A | 11/1980 | Ausnit |
| 4,240,241 A | 12/1980 | Sanborn, Jr. |
| 4,241,865 A | 12/1980 | Ferrell |
| 4,249,982 A | 2/1981 | Ausnit |
| 4,277,241 A | 7/1981 | Schulze |
| 4,285,376 A | 8/1981 | Ausnit |
| 4,341,575 A | 7/1982 | Herz |
| 4,355,494 A | 10/1982 | Tilman |
| 4,372,793 A | 2/1983 | Herz |
| 4,392,897 A | 7/1983 | Herrington |
| 4,410,130 A | 10/1983 | Herrington |
| 4,415,386 A | 11/1983 | Ferrell et al. |
| 4,419,159 A | 12/1983 | Herrington |
| RE31,487 E | 1/1984 | Friedberg |
| 4,430,070 A | 2/1984 | Ausnit |
| 4,437,293 A | 3/1984 | Sanborn, Jr. |
| 4,443,400 A | 4/1984 | Herrington |
| 4,517,788 A | 5/1985 | Scheffers |
| 4,518,087 A | 5/1985 | Goglio |
| 4,519,095 A | 5/1985 | Clayton |
| 4,528,224 A | 7/1985 | Ausnit |
| 4,532,652 A | 7/1985 | Herrington |
| 4,561,109 A | 12/1985 | Herrington |
| 4,563,319 A | 1/1986 | Ausnit et al. |
| 4,573,203 A | 2/1986 | Peppiatt |
| 4,581,006 A | 4/1986 | Hugues et al. |
| 4,582,549 A | 4/1986 | Ferrell et al. |
| 4,601,694 A | 7/1986 | Ausnit |
| 4,603,434 A | 7/1986 | Herrington |
| 4,612,153 A | 9/1986 | Mangla |
| 4,617,683 A | 10/1986 | Christoff |
| 4,618,383 A | 10/1986 | Herrington |
| 4,620,320 A | 10/1986 | Sullivan |
| 4,651,504 A | 3/1987 | Bentsen |
| 4,655,862 A | 4/1987 | Christoff et al. |
| 4,663,915 A | 5/1987 | Van Erden et al. |
| 4,666,536 A | 5/1987 | Van Erden et al. |
| 4,673,383 A | 6/1987 | Bentsen |
| 4,691,372 A | 9/1987 | Van Erden |
| 4,703,518 A | 10/1987 | Ausnit |
| 4,709,398 A | 11/1987 | Ausnit |
| 4,709,533 A | 12/1987 | Ausnit |
| 4,710,157 A | 12/1987 | Posey |
| 4,713,839 A | 12/1987 | Peppiatt |
| 4,736,450 A | 4/1988 | Van Erden et al. |
| 4,744,674 A | 5/1988 | Nocek |
| 4,782,951 A | 11/1988 | Griesbach et al. |
| 4,786,190 A | 11/1988 | Van Erden et al. |
| 4,787,754 A | 11/1988 | Herrington |
| 4,787,880 A | 11/1988 | Ausnit |
| 4,790,126 A | 12/1988 | Boechmann |
| 4,791,710 A | 12/1988 | Nocek et al. |
| 4,792,240 A | 12/1988 | Ausnit |
| 4,807,300 A | 2/1989 | Ausnit et al. |
| 4,812,074 A | 3/1989 | Ausnit et al. |
| 4,832,505 A | 5/1989 | Ausnit et al. |
| 4,840,012 A | 6/1989 | Boeckmann |
| 4,840,611 A | 6/1989 | Van Erden et al. |
| 4,844,759 A | 7/1989 | Boeckmann |
| 4,846,585 A | 7/1989 | Boeckmann et al. |
| 4,850,178 A | 7/1989 | Ausnit |
| 4,863,285 A | 9/1989 | Claxton |
| 4,876,842 A | 10/1989 | Ausnit |
| 4,877,336 A | 10/1989 | Peppiatt |
| 4,878,987 A | 11/1989 | Ven Erden |
| 4,891,867 A | 1/1990 | Takeshima et al. |
| 4,892,414 A | 1/1990 | Ausnit |
| 4,892,512 A | 1/1990 | Branson |
| 4,894,975 A | 1/1990 | Ausnit |
| 4,909,017 A | 3/1990 | McMahon et al. |
| 4,923,309 A | 5/1990 | VanErden |
| 4,925,316 A | 5/1990 | Van Erden et al. |
| 4,925,318 A | 5/1990 | Sorensen |
| 4,929,225 A | 5/1990 | Ausnit et al. |
| 4,941,307 A | 7/1990 | Wojcik |
| 4,969,309 A | 11/1990 | Schwarz et al. |
| 4,971,454 A | 11/1990 | Branson et al. |
| 4,974,395 A | 12/1990 | McMahon |
| 4,987,658 A | 1/1991 | Horita |
| 4,993,212 A | 2/1991 | Veoukas |
| 5,004,356 A | 4/1991 | Matsui |
| 5,007,142 A | 4/1991 | Herrington |
| 5,007,143 A | 4/1991 | Herrington |
| 5,010,627 A | 4/1991 | Herrington et al. |
| 5,014,498 A | 5/1991 | McMahon |
| 5,017,021 A | 5/1991 | Simonsen et al. |
| 5,020,194 A | 6/1991 | Herrington et al. |
| 5,023,122 A | 6/1991 | Boeckmann et al. |
| 5,024,537 A | 6/1991 | Tilman |
| 5,027,584 A | 7/1991 | McMahon et al. |
| RE33,674 E | 8/1991 | Uramoto |
| 5,036,643 A | 8/1991 | Bodolay |
| 5,042,224 A | 8/1991 | McMahon |
| 5,046,300 A | 9/1991 | Custer et al. |
| 5,050,736 A | 9/1991 | Griesbach et al. |
| 5,063,069 A | 11/1991 | Van Erden et al. |
| 5,063,639 A | 11/1991 | Boeckmann et al. |
| 5,063,644 A | 11/1991 | Herrington et al. |
| 5,067,208 A | 11/1991 | Herrington, Jr. et al. |
| 5,067,822 A | 11/1991 | Wirth et al. |
| 5,070,583 A | 12/1991 | Herrington |
| 5,071,689 A | 12/1991 | Tilman |
| 5,072,571 A | 12/1991 | Boeckmann |
| 5,085,031 A | 2/1992 | McDonald |
| 5,088,971 A | 2/1992 | Herrington |
| 5,092,684 A | 3/1992 | Weeks |
| 5,092,831 A | 3/1992 | James et al. |
| 5,096,516 A | 3/1992 | McDonald et al. |
| 5,100,246 A | 3/1992 | La Pierre et al. |
| 5,107,658 A | 4/1992 | Hustad et al. |
| 5,111,643 A | 5/1992 | Hobock |
| 5,112,138 A | 5/1992 | Peppiatt |
| 5,116,301 A | 5/1992 | Robinson et al. |
| 5,121,997 A | 6/1992 | La Pierre et al. |
| 5,127,208 A | 7/1992 | Custer et al. |
| 5,129,734 A | 7/1992 | Van Erden |

| | | |
|---|---|---|
| 5,131,121 A | 7/1992 | Herrington, Jr. et al. |
| 5,152,613 A | 10/1992 | Herrington, Jr. |
| 5,161,286 A | 11/1992 | Herrington, Jr. et al. |
| 5,167,608 A | 12/1992 | Steffens, Jr. et al. |
| 5,179,816 A | 1/1993 | Wojnicki |
| 5,185,909 A | 2/1993 | Inagaki |
| 5,186,543 A | 2/1993 | Cochran |
| 5,188,461 A | 2/1993 | Sorensen |
| 5,189,764 A | 3/1993 | Herrington et al. |
| 5,198,055 A | 3/1993 | Wirth et al. |
| 5,211,482 A | 5/1993 | Tilman |
| 5,224,779 A | 7/1993 | Thompson et al. |
| 5,238,306 A | 8/1993 | Heintz et al. |
| 5,247,781 A | 9/1993 | Runge |
| 5,259,904 A | 11/1993 | Ausnit |
| 5,273,511 A | 12/1993 | Boeckman |
| 5,279,693 A | 1/1994 | Robinson et al. |
| 5,283,932 A | 2/1994 | Richardson et al. |
| RE34,554 E | 3/1994 | Ausnit |
| 5,301,394 A | 4/1994 | Richardson et al. |
| 5,301,395 A | 4/1994 | Richardson et al. |
| 5,322,579 A | 6/1994 | Van Erden |
| 5,330,269 A | 7/1994 | Kamada et al. |
| 5,334,127 A | 8/1994 | Bruno et al. |
| 5,383,989 A | 1/1995 | McMahon |
| 5,391,136 A | 2/1995 | Makowka |
| 5,400,565 A | 3/1995 | Terminella et al. |
| 5,400,568 A | 3/1995 | Kanemitsu et al. |
| RE34,905 E | 4/1995 | Ausnit |
| 5,403,094 A | 4/1995 | Tomic |
| 5,405,478 A | 4/1995 | Richardson et al. |
| 5,405,629 A | 4/1995 | Marnocha et al. |
| 5,412,924 A | 5/1995 | Ausnit |
| 5,415,904 A | 5/1995 | Takubo et al. |
| 5,425,216 A | 6/1995 | Ausnit |
| 5,425,825 A | 6/1995 | Rasko et al. |
| 5,426,830 A | 6/1995 | Richardson et al. |
| 5,431,760 A | 7/1995 | Donovan |
| 5,435,864 A | 7/1995 | Machacek et al. |
| 5,442,837 A | 8/1995 | Morgan |
| 5,442,838 A | 8/1995 | Richardson et al. |
| 5,448,807 A | 9/1995 | Herrington, Jr. |
| 5,448,808 A | 9/1995 | Gross |
| 5,456,928 A | 10/1995 | Hustad et al. |
| 5,461,845 A | 10/1995 | Yeager |
| 5,470,156 A | 11/1995 | May |
| 5,482,375 A | 1/1996 | Richardson et al. |
| 5,486,051 A | 1/1996 | May |
| 5,489,252 A | 2/1996 | May |
| 5,492,411 A | 2/1996 | May |
| 5,505,037 A | 4/1996 | Terminella et al. |
| 5,509,735 A | 4/1996 | May |
| 5,511,884 A | 4/1996 | Bruno et al. |
| 5,513,915 A | 5/1996 | May |
| 5,519,982 A | 5/1996 | Herber et al. |
| 5,523,136 A | 6/1996 | Fischer et al. |
| 5,525,363 A | 6/1996 | Herber et al. |
| 5,529,394 A | 6/1996 | Davoren |
| 5,542,902 A | 8/1996 | Richison et al. |
| 5,551,127 A | 9/1996 | May |
| 5,551,208 A | 9/1996 | Van Erden |
| 5,552,202 A | 9/1996 | May |
| 5,557,907 A | 9/1996 | Malin et al. |
| 5,558,613 A | 9/1996 | Tilman et al. |
| 5,561,966 A | 10/1996 | English |
| 5,564,259 A | 10/1996 | Stolmeier |
| 5,573,614 A | 11/1996 | Tilman et al. |
| 5,582,853 A | 12/1996 | Marnocha et al. |
| 5,592,802 A | 1/1997 | Malin et al. |
| 5,613,934 A | 3/1997 | May |
| 5,628,566 A | 5/1997 | Schreiter |
| 5,645,905 A | 7/1997 | Takubo et al. |
| 5,647,671 A | 7/1997 | May |
| 5,664,296 A | 9/1997 | May |
| 5,669,715 A | 9/1997 | Dobreski et al. |
| 5,681,115 A | 10/1997 | Diederich et al. |
| 5,682,730 A | 11/1997 | Dobreski |
| 5,711,751 A | 1/1998 | Harmanoglu |
| 5,713,110 A | 2/1998 | Covi et al. |
| 5,713,669 A | 2/1998 | Thomas et al. |
| 5,718,337 A | 2/1998 | Carr et al. |
| 5,725,312 A | 3/1998 | May |
| 5,769,772 A | 6/1998 | Wiley |
| 5,775,812 A | 7/1998 | St. Phillips et al. |
| 5,782,733 A | 7/1998 | Yeager |
| 5,788,378 A | 8/1998 | Thomas |
| 5,823,933 A | 10/1998 | Yeager |
| 5,833,791 A | 11/1998 | Bryniarski et al. |
| 5,851,070 A | 12/1998 | Dobreski et al. |
| 5,867,875 A | 2/1999 | Beck et al. |
| 5,871,281 A | 2/1999 | Stolmeier et al. |
| 5,896,627 A | 4/1999 | Cappel et al. |
| 5,906,438 A | 5/1999 | Laudenberg |
| 5,911,508 A | 6/1999 | Dobreski et al. |
| 5,919,535 A | 7/1999 | Dobreski et al. |
| 5,924,173 A | 7/1999 | Dobreski et al. |
| 5,956,924 A | 9/1999 | Thieman |
| 5,964,532 A | 10/1999 | St. Phillips et al. |
| 6,010,244 A | 1/2000 | Dobreski et al. |
| 6,178,722 B1 | 1/2001 | McMahon |
| 6,286,189 B1 | 9/2001 | Provan et al. |
| 6,289,561 B1 | 9/2001 | Provan et al. |
| 6,292,986 B1 | 9/2001 | Provan et al. |

FOREIGN PATENT DOCUMENTS

| | | |
|---|---|---|
| EP | 0 371 402 A3 | 6/1990 |
| EP | 0 371 402 A1 | 6/1990 |
| GB | 522663 | 6/1940 |
| GB | 2 085 519 A | 10/1980 |
| GB | 2 138 494 A | 3/1983 |
| WO | WO 91/13759 | 9/1991 |
| WO | WO 95/29604 | 11/1995 |
| WO | WO 95/35046 | 12/1995 |
| WO | WO95/35047 | 12/1995 |
| WO | WO 95/35048 | 12/1995 |
| WO | WO 99/24325 | 5/1999 |

OTHER PUBLICATIONS

Thomas Weller, "Cyclic Olefin Copolymers—New Engineering Polyolefin Offers Clear Processing Opportunities," *Plastics Technology; The Magazine of Plastics Manufacturing*, Jun. 1997, 6 pages.

Ticona Brochure entitled "Engineering Polymers for Technical Solutions," Nov. 1998, 4 pages.

Ticona Brochure entitled "Topas® Cyclic Olefin Copolymers Optics Applications," 2001, 12 pages.

Ticona Brochure entitled "Topas® Cyclic Olefin Copolymer Flexible Packaging," 2000, 4 pages.

Ticona Brochure entitled "Topas® Cyclic Olefin Copolymer Pharmaceutical Blister Packaging," 2000, 4 pages.

Ronald R. Lamonte and Donal McNally, "Cyclic Olefin Copolymers," reprint from Feb. 2000 issue of *Advanced Materials & Processes*, 4 pages.

FINS AND PROFILES FOR PLASTIC BAGS

FIELD OF THE INVENTION

The present invention relates generally to plastic bags. More particularly, the present invention relates to the use of materials in plastic bags to strengthen the fins and/or profiles of fasteners in plastic bags.

BACKGROUND OF THE INVENTION

Plastic bags are in widespread use in a varied and diverse number of household and commercial applications, especially in the food packaging industry. One advantage of plastic bags is their ease of opening and resealing. Some of these bags are reclosable via the use of a reclosable feature such as a reclosable fastener. In many bags, the fasteners can be opened and closed either by pressure or by the use of an auxiliary slider mechanism.

A factor which affects the acceptance and range of application of plastic bags is the strength and reliability of the reclosable fasteners on the bags. Many of the presently available reclosable fasteners are made of materials such as low density polyethylenes and linear low density polyethylenes which do not have sufficient mechanical strength to prevent the fasteners from opening. The failure of the fasteners may result in spillage of the contents of the bags and can lead to extreme customer dissatisfaction.

Since the popularity of plastic bags has placed increased demands on the tasks they are asked to perform, a need exists for bags having fasteners that are able to withstand increased forces and more adverse conditions.

SUMMARY OF THE INVENTION

According to one embodiment, a fastener for a plastic bag comprises a male track including a male profile and a first fin extending from the male profile and a female track including a female profile and a second fin extending from the female profile. At least one of the first and second fins comprises a cyclic olefin copolymer. The cyclic olefin copolymer has a glass transition temperature, $T_g$, of greater than about 20° C. as determined by ASTM D3418. The cyclic olefin copolymer may comprise from about 10 to about 90 mol. % norbornene. At least one of the first and second fins may comprise an additional polymer selected from a polyolefinic resin, an engineering resin, and a combination thereof.

According to another embodiment, a fastener for a plastic bag comprises a male track including a male profile and a first fin extending from the male profile and a female track including a female profile and a second fin extending from the female profile. At least one of the male and female profiles comprises a cyclic olefin copolymer. The cyclic olefin copolymer has a glass transition temperature, $T_g$, of greater than about 20° C. as determined by ASTM D3418. The cyclic olefin copolymer may comprise from about 10 to about 90 mol. % norbornene. At least one of the male and female profiles may comprise an additional polymer selected from a polyolefinic resin, an engineering resin, and a combination thereof.

According to another embodiment, a fastener for a plastic bag comprises a male track including a male profile and a first fin extending from the male profile and a female track including a female profile and a second fin extending from the female profile. At least one of the male and female profiles comprises a cyclic olefin copolymer and at least one of the first and second fins comprises a cyclic olefin copolymer. The cyclic olefin copolymer has a glass transition temperature, $T_g$, of greater than about 20° C. as determined by ASTM D3418. At least one of the first and second fins may comprise an additional polymer selected from a polyolefinic resin, an engineering resin, and a combination thereof. At least one of the male and female profiles may comprise an additional polymer selected from a polyolefinic resin, an engineering resin, and a combination thereof.

According to a further embodiment, a polymeric bag comprises first and second opposing body panels fixedly connected to each other along a pair of sides and a bottom bridging the pair of sides and a reclosable fastener extending along a mouth formed opposite the bottom. The fastener includes a pair of interlocking flexible plastic tracks including a male track including a male profile and a first fin, the first fin extending from the male profile and a female track including a female profile and a second fin, the second fin extending from the female profile. At least one of the first and second fins comprises a cyclic olefin copolymer. The cyclic olefin copolymer has a glass transition temperature, $T_g$, of greater than about 20° C. as determined by ASTM D3418. The cyclic olefin copolymer may comprise from about 10 to about 90 mol. % norbornene. At least one of the first and second fins may comprise an additional polymer selected from a polyolefinic resin, an engineering resin, and a combination thereof. The bag may comprise a slider slidably mounted to the fastener for movement between a closed position and an open position.

According to a still further embodiment, a polymeric bag comprises first and second opposing body panels fixedly connected to each other along a pair of sides and a bottom bridging the pair of sides and a reclosable fastener extending along a mouth formed opposite the bottom. The fastener includes a pair of interlocking flexible plastic tracks including a male track including a male profile and a first fin, the first fin extending from the male profile and a female track including a female profile and a second fin, the second fin extending from the female profile. At least one of the male and female profiles comprises a cyclic olefin copolymer. The cyclic olefin copolymer has a glass transition temperature, $T_g$, of greater than about 20° C. as determined by ASTM D3418. The cyclic olefin copolymer may comprise from about 10 to about 90 mol. % norbornene. At least one of the male and female profiles may comprise an additional polymer selected from a polyolefinic resin, an engineering resin, and a combination thereof. The bag may comprise a slider slidably mounted to the fastener for movement between a closed position and an open position.

According to a still further embodiment, a polymeric bag comprises first and second opposing body panels fixedly connected to each other along a pair of sides and a bottom bridging the pair of sides and a reclosable fastener extending along a mouth formed opposite the bottom. The fastener includes a pair of interlocking flexible plastic tracks including a male track including a male profile and a female track including a female profile. At least one of the male and female profiles comprises a cyclic olefin copolymer. The cyclic olefin copolymer has a glass transition temperature, $T_g$, of greater than about 20° C. as determined by ASTM D3418. The cyclic olefin copolymer may comprise from about 10 to about 90 mol. % norbornene. At least one of the male and female profiles may comprise an additional polymer selected from a polyolefinic resin, an engineering resin, and a combination thereof The bag may comprise a slider slidably mounted to the fastener for movement between a closed position and an open position.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
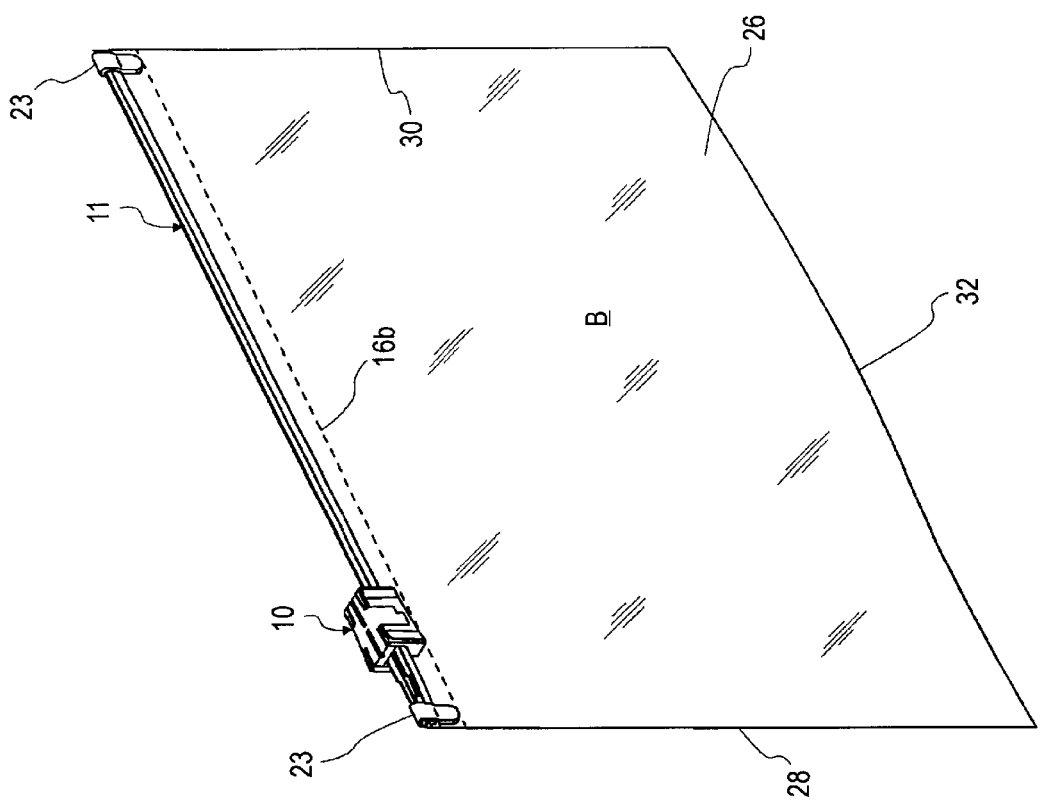
FIG. 1 is a perspective view of a thermoplastic bag having a fastener and slider.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Referring to FIG. 1, there is illustrated a plastic slider 10 and a profiled plastic fastener or zipper 11. The slider 10 and fastener 11 are particularly suited for thermoplastic bags and the like. Slider 10 has been illustrated in FIG. 2 assembled on the fastener 11 at the top edge or mouth of a thermoplastic bag B. The plastic slider 10 and the profiled fastener 11 cooperate to close the bag B. To assist in opening the bag, the slider 10 is slidably mounted to the fastener 11 for movement between a closed position and an open position.

Figure 2:
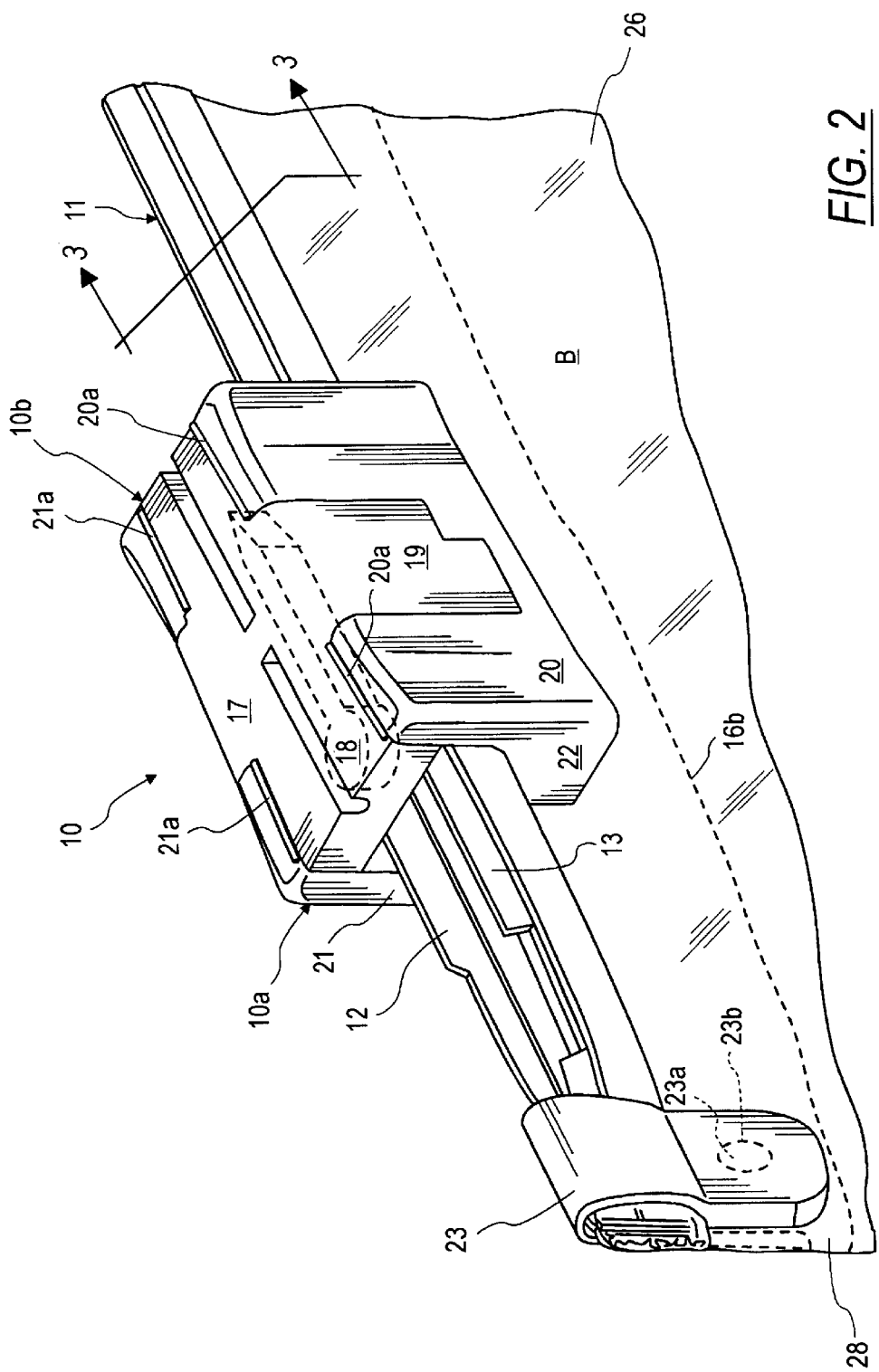
FIG. 2 is an enlarged perspective view of the fastener and slider of FIG. 1 in assembled position on a thermoplastic bag.

Bag B (as shown in FIGS. 1 and 2) is formed from a single flexible plastic sheet folded upon itself and comprises first and second opposing body panels 25, 26. Body panels 25, 26 are fixedly connected to each other along a pair of sides 28, 30 and a bottom 32 which extends between the pair of sides 28, 30. The fastener 11 (as shown in FIG. 2) extends along the top edge or mouth formed opposite the bottom 32 of bag B, in which the fastener 11 has a male track 12 and a female track 13.

Alternatively, bag B may be formed from separate plastic sheets where the first and second opposing body panels are sealed after being initially separated so as to form the pair of sides and the bottom (ie., sealed on three sides). Alternatively, bag B may be formed from a single flexible plastic sheet having a side fold, a seal on the side opposite the side fold, and an end seal (not shown).

Alternatively, bag B (not shown) may be a stand-up polymeric bag which comprises first and second opposing body panels and a bottom wall and a reclosable feature or fastener, such as a reclosable zipper which can be opened and closed either by the use of an auxiliary slider mechanism, by finger pressure, or by an auxiliary squeezing device other than an auxiliary slider mechanism. The first and second opposing body panels are coupled to opposing portions of the bottom wall. The bottom wall may be a gusseted bottom wall comprising gusseted portions or may be comprised of configurations other than a gusseted bottom wall. One example of a stand-up polymeric bag is shown in U.S. Pat. No. 6,148,588 to Thomas et al. As will be discussed below, the materials which may be used in the reclosable feature or fastener of the stand-up polymeric bag comprise at least one polymeric material which possesses excellent resistance to stress and superior strength properties. In particular, a cyclic olefin copolymer may be used in the reclosable feature or fastener of the stand-up polymeric bag. It is contemplated that the reclosable feature or fastener may comprise 100 wt. % cyclic olefin copolymer or may comprise a combination of a cyclic olefin copolymer and one or more additional polymers as discussed below with respect to the fins 16a, 16b and/or the profiles 14, 15 of the bag.

Figure 3:
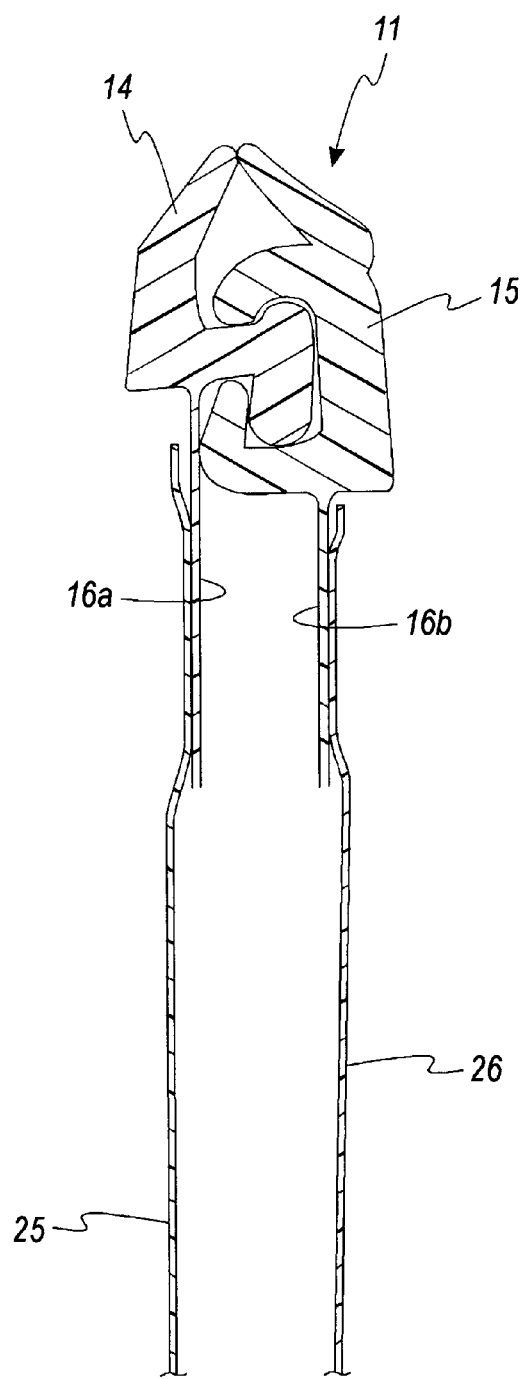
FIG. 3 is a sectional view of the fastener of FIGS. 1 and 2 taken generally along line 3—3 in FIG. 2.

As shown in FIGS. 2 and 3, male and female tracks 12, 13 have interlocking male and female profiles 14, 15 extending the length thereof in the form of rib and groove elements on the respective tracks. The male track 12 includes a male profile 14 and a first depending fin or flange 16a, extending downward from the male profile 14. Likewise, the female track 13 includes a female profile 15 and a second depending fin or flange 16b extending downward from the female profile 15. The fins 16a, 16b are shown attached to opposing body panels 25, 26 in FIG. 3. The tracks 12, 13 may be extruded separately with fins 16a, 16b and attached to the respective sides of the bag mouth or the tracks 12, 13 may be extruded integral with the sides of the bag mouth. If the tracks 12, 13 are extruded separately, they are most effectively attached by means of the respective first and second fins 16a, 16b, incorporated within the tracks, such as by heat sealing to the bag mouth.

The male and female profiles 14, 15 have complementary cross-sectional shapes. The cross-sectional shapes of the interlocking male and female profiles 14, 15 shown in FIG. 3 are the subject of the invention claimed in U.S. Pat. No. 5,007,143 to Herrington, which is incorporated herein by reference.

In the open position of the slider 10, the male and female profiles 14, 15 are disengaged from each other so that a user can gain access to the interior of the bag B. Movement of the slider 10 from the open position to the closed position interlocks the male and female profiles 14, 15 so as to restrict access to the interior of the bag B. For example, the male and female tracks 14, 15 may be rolled or pressed into their interlocking arrangement so as to securely close the bag by one of two means. First, the tracks may be rolled or pressed together at one end by a user and then sequentially fitted together along the length of the fastener by the user running a finger along the length of the fastener on each side of the tracks. Alternatively, some bags employ a plastic slider that rides along the tracks of the fastener. If the slider is pulled in one direction, the bag is sealed shut; if the slider is pulled in the opposite direction, the bag is reopened.

As may be seen in FIG. 2, the slider 10 straddles the fastener 11 at the top of the bag B and is adapted for opening or closing the interlocking tracks 12, 13 of the fastener 11. The slider 10 may be molded from any suitable plastic including, but not limited to, nylon, polypropylene, polyethylene, polystyrene, copolymers of polyethylene and polypropylene, polycarbonates, polyesters, polyacetals, or acrylic-butadiene-styrene copolymers.

As shown in FIG. 2, the slider 10 comprises an inverted generally U-shaped member including a transverse support member or body 17 from which the separator finger 18 extends downward. The body 17 is itself U-shaped and includes two integral legs 19 extending downward. The finger 18 is positioned between the legs 19. The body 17 is adapted to move along the top edges of the tracks 12, 13 with the legs 19 straddling these elements and the finger 18 positioned between the tracks 12, 13. The slider 10 also includes a pair of hinged "wings" 20, 21 that can be folded down into their final position. The wings 20, 21 are hinged to the main slider body 17 by means of hinge structures 20a, 21a located at the opposite ends of the legs 19.

The foldable depending wings or side walls 20, 21 extend from an opening end 10a of the slider 10 to a closing end 10b. It is noted that the main slider body 17 and the separator finger 18 are wider at the opening end 10a than at the closing end 10b. Similarly, the side walls 20, 21 and the legs 19 are spaced wider apart at the opening end 10a of the slider 10 to permit separation of the male and female profiles 14, 15 by the finger 18 engaging the tracks 12, 13. The wings 20, 21 and legs 19 are spaced sufficiently close together at the closing end 10b of the slider to press the male and female profiles 14, 15 into an interlocking relationship as the slider 10 is moved in a fastener closing direction. As shown in FIG. 2, the side walls 20, 21 at their lower ends are provided with an inwardly extending shoulder structure 22. Shoulder structure 22 engages a bottom of the fastener 11 to prevent slider 10 from being lifted off the edges of the tracks 12, 13 while the slider 10 straddles the fastener 11.

The opposite ends of the fastener 11 are typically provided with opposing end termination clips, such as end termination clip 23 of FIGS. 1–2. Each end clip 23 comprises a strap member which wraps over the top of the fastener 11. One end of the strap is provided with a rivet like member 23a which is adapted to penetrate through the bag material and into a cooperating opening 23b at the other end of the clip 23. The rivet 23a is then deformed so as to create a head locked into the opening 23b.

End termination clips may have various purposes such as (a) preventing or inhibiting the slider 10 from going past the ends of the fastener 11, (b) interacting with the slider 10 to give a tactile indication of being closed, (c) assisting in inhibiting or preventing leakage from the bag B and (d) holding the male and female profiles 14, 15 together and providing additional strength in resisting stresses applied to the profiles 14, 15 during normal use of the bag B. Further details concerning the construction and operation of the slider 10 and the end clips 23 may be obtained from U.S. Pat. No. 5,067,208 to Herrington, Jr. et al., which is incorporated herein by reference in its entirety.

It is contemplated that other end terminations may be used instead of the above-described end terminations clip 23. For example, an end weld may be formed by heated bars pressed against the end of the fastener, ultrasonic welding or other ways known in the art.

It also contemplated the fastener (not shown) which is used in bag B may be opened and closed either by finger pressure or an auxiliary squeezing device other than an auxiliary slider mechanism. In other words, a press to close type fastener may be used in bag B rather than a fastener having slider 10 as shown in FIGS. 1–2. Where a press to close type fastener is used in bag B, the tracks may have integrally formed profiles and fins.

The fins 16a, 16b and/or profiles 14, 15 of the present invention comprise at least one polymeric material which possesses excellent resistance to stress and superior strength properties. In particular, a cyclic olefin copolymer may be used in the fins 16a, 16b and/or profiles 14, 15 of the bag B. It is contemplated that the fins 16a, 16b and/or profiles 14, 15 may comprise 100 wt. % cyclic olefin copolymer.

Alternatively, the fins 16a, 16b and/or the profiles 14, 15 of the bag B may comprise a combination of a cyclic olefin copolymer and one or more additional polymers. Where a cyclic olefin copolymer and one or more additional polymers are used in forming the fins 16a, 16b and/or the profiles 14, 15 of the bag B, the cyclic olefin copolymer and the additional polymer(s) may be blended (i.e., into a monolayer) as shown in FIG. 3, for example.

The use of at least one polymeric material in the fins 16a, 16b and/or profiles 14, 15 as described herein significantly improves the strength of the fins 16a, 16b and/or profiles 14, 15 in comparison to fins 16a, 16b and/or profiles 14, 15 made from low density polyethylenes (LDPE), medium density polyethylenes (MDPE), high density polyethylenes (HDPE), and/or linear low density polyethylenes (LLDPE).

Where a cyclic olefin copolymer and one or more additional polymers are used in forming the fins 16a, 16b and/or the profiles 14, 15 of the bag B, the fins and/or profiles generally comprise from about 1 wt. % to about 99 wt. % of the cyclic olefin copolymer and from about 1 wt. % to about 99 wt. % of the additional polymer(s). In some embodiments, the fins and/or profiles comprise from about 1 wt. % to about 40 wt. % of the cyclic olefin copolymer and from about 60 wt. % to about 99 wt. % of the additional polymer(s). In other embodiments, the fins and/or profiles comprise from about 20 wt. % to about 40 wt. % of the cyclic olefin copolymer and from about 60 wt. % to about 80 wt. % of the additional polymer(s). The amount of cyclic olefin copolymer which is used in the fins and/or profiles depends on a variety of factors including, but not limited to, customer requirements, the applications in which the bags are used, the desired properties of the bags, cost, and the like.

It is also contemplated that in some embodiments, the opposing body panels 25, 26 may also comprise a cyclic olefin copolymer and/or a combination of a cyclic olefin copolymer and one or more additional polymers. Where a cyclic olefin copolymer and one or more additional polymers are used in forming the opposing body panels 25, 26 of the bag B, the cyclic olefin copolymer and the additional polymer(s) may be blended (i.e., into a monolayer).

Cyclic Olefin Copolymer

The cyclic olefin copolymers of the present invention generally have a molecular weight distribution or polydispersity ($M_w/M_n$, "MWD") from about 2.0 to about 5.0, and preferably from about 2.0 to about 2.5. The cyclic olefin copolymers of the present invention are generally transparent and are generally miscible or compatible with certain polymers such as polyethylene.

The cyclic olefin copolymers generally have a density of from about 0.90 to about 1.10 g/cm$^3$, typically from about 0.95 to about 1.05 g/cm$^3$ and more typically from about 1.00 to about 1.03 g/cm$^3$. The heat deflection temperature (HDT, measured at 66 psi) of cyclic olefin copolymers generally is from about 50 to about 200° C., and typically from about 70 to about 170° C.

The melt flow index (MI) of the cyclic olefin copolymers is generally from about 1 to about 100 g/10 min. and typically from about 4 to about 20 g/10 min. at 115° C. (239° F.) above its corresponding HDT as determined by ISO 1133.

The cyclic olefin copolymers may be made from copolymers of ethylene and norbornene. The mole % of ethylene and norbornene may vary with respect to each other. For example, the amount of norbornene is generally from about 10 to about 90 mol. %, with the remainder being ethylene (from about 10 to about 90 mol. %). The amount of norbornene is typically from about 20 to about 70 mol. % with the remainder being ethylene. The amount of norbornene is more typically from about 35 to about 60 mol. % with the remainder being ethylene. The cyclic olefin copolymers may be made using metallocene catalysts.

The glass transition temperature ($T_g$) of the cyclic olefin copolymer is generally greater than about 20° C., typically greater than about 50° C., and preferably greater than about 75° C., as measured by ASTM D3418. The glass transition temperature of the cyclic olefin copolymer may be greater than about 100° C. or about 150° C. as measured by ASTM D3418. The glass transition temperature ($T_g$) of the cyclic olefin copolymers increases as the mole % of norbornene in the copolymer increases. For example, the glass transition temperature ($T_g$) of a cyclic olefin copolymer comprising 20 mol. % norbornene and 80 mol. % ethylene is about 25° C., while the glass temperature transition of a cyclic olefin copolymer comprising 70 mol. % norbornene and 30 mol. % ethylene is about 210° C. The glass temperature transition ($T_g$) of a cyclic olefin copolymer comprising 30 mol. % norbornene and 70 mol. % ethylene is about 75° C., while a cyclic olefin copolymer comprising 60 mol. % norbornene and 40 mol. % ethylene is about 180° C.

The flexural modulus of the cyclic olefin copolymer is generally from about 300,000 to about 600,000 psi, and more specifically from about 400,000 to about 500,000 psi as measured by ASTM D790. The tensile modulus of the cyclic olefin copolymers is generally from about 300,000 to about 600,000 psi, and more specifically from about 400,000 to about 500,000 psi, as determined by ISO 527.

The moisture barrier properties of the cyclic olefin copolymer is generally from about 0.01 to about 0.06 g-mm/m$^2$/day at 23° C. at 85% relative humidity, and more specifically from about 0.023 to about 0.045 g-mm/m$^2$/day at 23° C. at 85% relative humidity as measured by DIN 53 122.

Useful cyclic olefin copolymers are available from several companies. For example, Ticona, a business of Celanese AG, in Summit, N.J. has cyclic olefin copolymers available.

Other companies that have cyclic olefin copolymers available include Nippon Zeon Co., Ltd. (Japan) and Mitsui Chemical (Japan). Nippon Zeon Co., Ltd. has commercially available cyclic olefin copolymers (COCs) under the designation ZEONEX®. Ticona, a business of Celanese AG, has commercially available cyclic olefin copolymers (COCs) under the designation TOPAS®. The cyclic olefin copolymers which are commercially available under the designation TOPAS® are believed to be prepared with feedstocks of norbornene and ethylene and the use of a metallocene catalyst. There are believed to be at least four grades of TOPAS® resins available (TOPAS® 8007, TOPAS® 6013, TOPAS® 6015, and TOPAS® 6017). The four grades of TOPAS® resins available have glass transition temperatures, $T_g$, of 85, 140, 160 and 180° C., respectively. The corresponding norbornene levels of the four grades of TOPAS® resins are believed to be about 35, 48, 55 and 59 mol. %.

Additional Polymer(s)

The additional polymer(s) that may be used in forming the fins 16a, 16b and/or the profiles 14, 15 of the bag B include polyolefinic resins, engineering resins, or combinations thereof.

Nonlimiting examples of polyolefinic resins which may be used in combination with the cyclic olefin copolymers in the fins 16a, 16b and/or profiles 14, 15 include low density polyethylenes, linear low density polyethylenes, high density polyethylenes (HDPE), medium density polyethylenes (MDPE), polypropylenes, plastomers, elastomers, ethylene vinyl acetates (EVA), ethyl methacrylates, polymethylpentene copolymers, polyisobutylenes, polyolefin ionomers, or combinations thereof. It is contemplated that other polyolefinic resins may be used. The preferred polyolefinic resins are low density polyethylenes and linear low density polyethylenes. In some applications, the addition of one or more polyolefinic resins to the cyclic olefin copolymer may assist in enhancing the adhesion, toughness, tear resistance, and/or puncture resistance of the fins 16a, 16b and/or profiles 14, 15.

Where a polyolefinic resin is used, an alkenyl aromatic polymer (e.g., polystyrene, ethylene-styrene interpolymers, etc.) may also be used. For example, the alkenyl aromatic polymer may be added in an amount from about 0.1 wt. % to about 50 wt. % of the polyethylene. Further details may be obtained from U.S. Pat. Nos. 4,579,912; 4,716,201; 4,743,649; and 4,804,564.

Nonlimiting examples of engineering resins which may be used in combination with the cyclic olefin copolymers in the fins 16a, 16b and/or profiles 14, 15 include polycarbonates, polyesters, polyamides, polyacetals, polyacrylates, polysulfones, polyphenylene sulfides, polyphenylene ethers, liquid crystal polymers (LCPs), or combinations thereof. In some applications, the addition of one or more engineering resins to the cyclic olefin copolymer may assist in enhancing the modulus, dead fold properties, and/or thermal stability of the fins and/or profiles and may also assist in decreasing the shrinkage of the fins and/or profiles.

Figure 6:
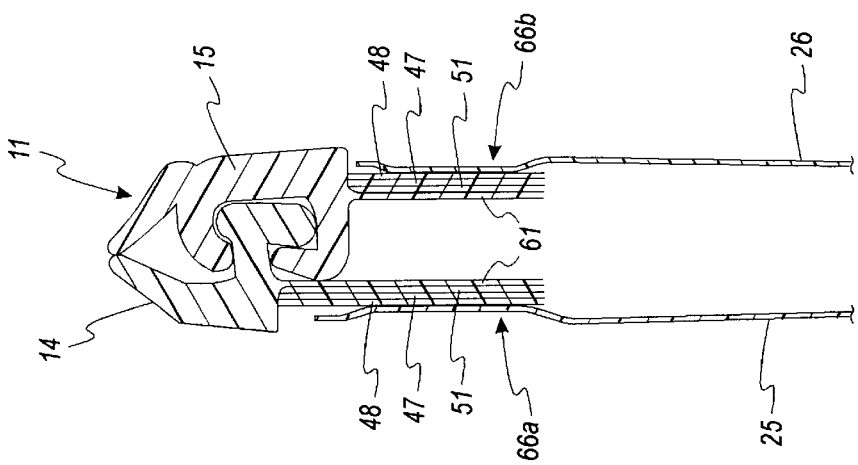
FIG. 6 is a sectional view of a fastener having fins comprising four layers according to another embodiment of the present invention.
Figure 7:
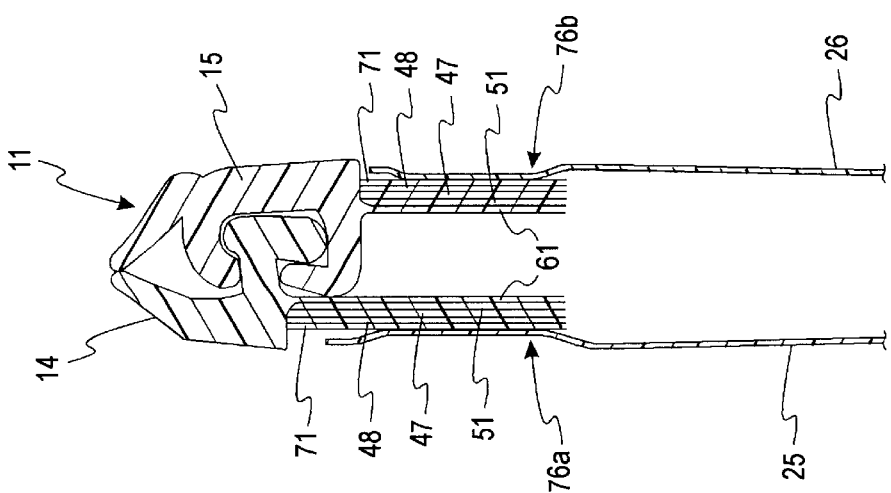
FIG. 7 is a sectional view of a fastener having fins comprising five layers according to yet another embodiment of the present invention.
Figure 8:
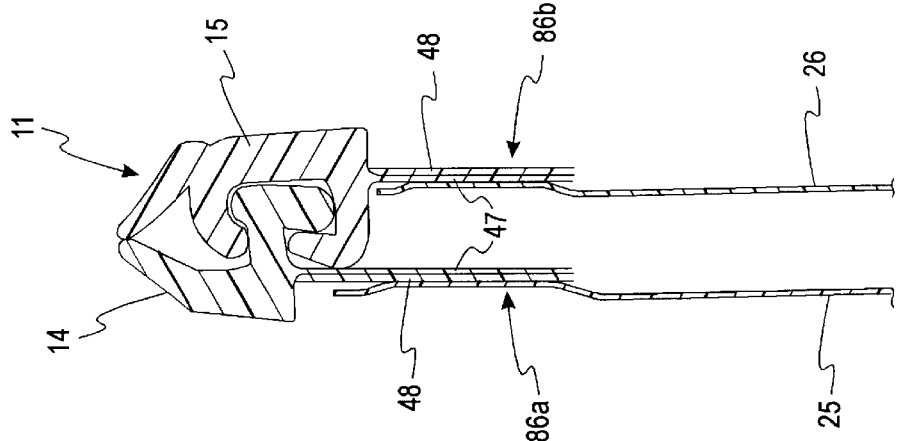
FIG. 8 is a sectional view of a fastener having fins constructed in accordance with a further embodiment of the invention.
Figure 9:
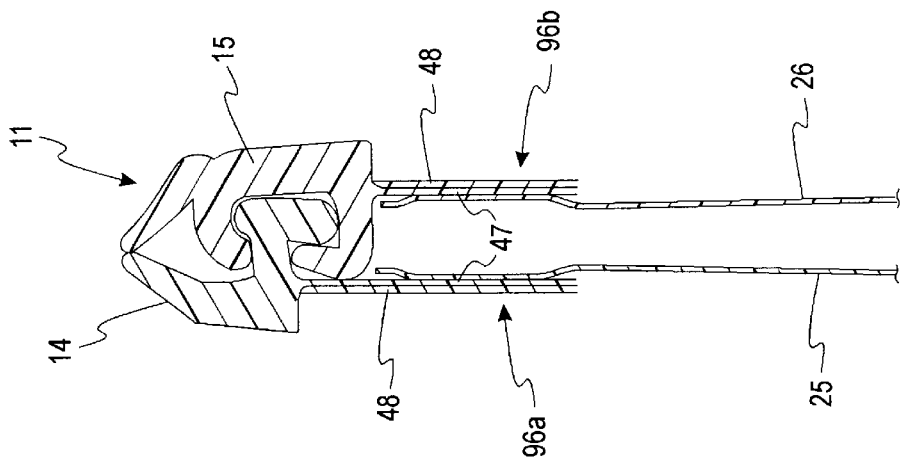
FIG. 9 is a sectional view of a fastener having fins constructed in accordance with a still further embodiment of the invention.
Figure 10:
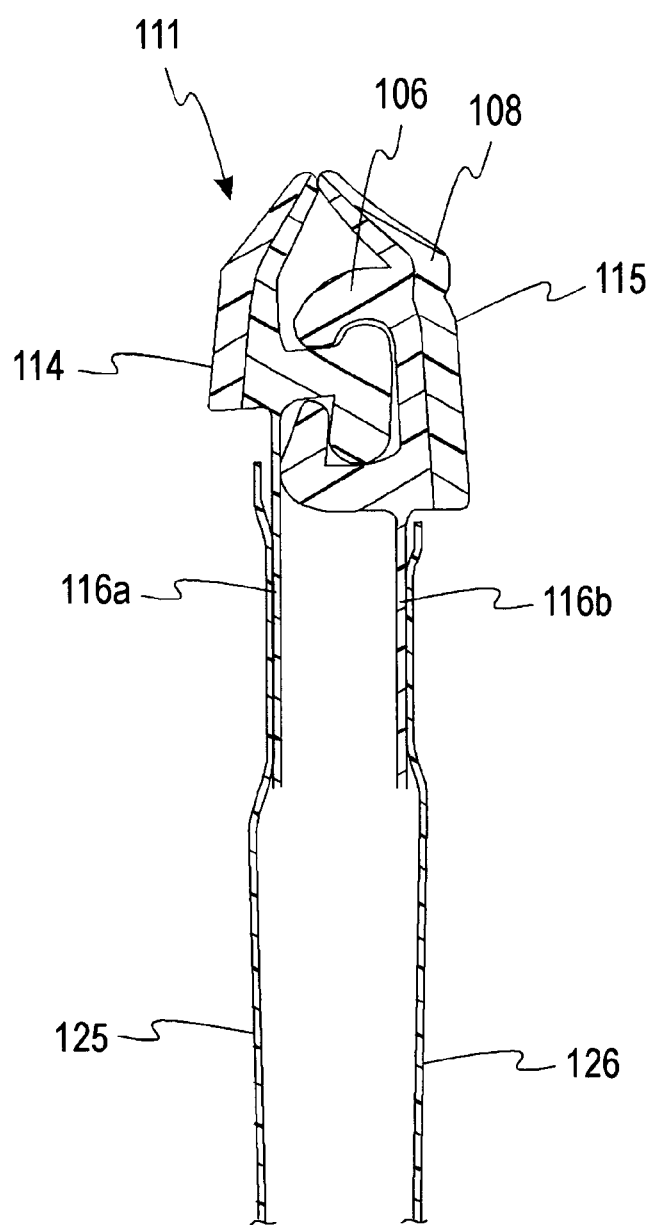
FIG. 10 is a sectional view of a fastener having profiles comprising two layers according to another embodiment of the present invention.

In another embodiment of the invention, the fins 16a, 16b may be formed of multiple layers such as shown in FIGS. 4–9. In a further embodiment of the invention, the fins 16a, 16b may be located on the interior portion of the bag and/or on the exterior portion of the bag as shown in FIGS. 8–9. In a still further embodiment of the invention, the profiles 14, 15 may be formed of multiple layers as shown in FIG. 10.

It is contemplated that the fins may be formed of multiple layers. Examples of fins which are formed of two, three, four, and five layers are depicted in FIGS. 4–9. Where a multiple layered fin structure is used, at least one of the layers may comprise the same materials as described above in making the fins 16a, 16b and/or the profiles 14, 15 of the bag B in the form of a monolayer. In other words, at least one of the layers may comprise a cyclic olefin copolymer and may optionally comprise an additional polymer(s) selected from polyolefinic resins, engineering resins, or combinations thereof as described above.

Nonlimiting examples of suitable additional layers that may be used in one or more of the layers in a multiple layered fin structure include a tie layer, a polyolefin(s) layer, a barrier layer, or a sealant layer. The materials which are selected for use in a fin structure having multiple layers may vary based on a variety of factors including, but not limited to, customer requirements, the applications in which the bags may be used, the desired properties of the bags, cost, and the like.

Nonlimiting examples of materials suitable for use in forming a tie layer include EVAs, anhydride modified polyolefins, anhydride modified ethylene-acrylates, anhydride modified EVAs, acid modified EVAs, acid modified ethylene-acrylates, amorphous polyolefin-modified EVA polymers or combinations thereof. Some examples of anhydride modified polyolefins include anhydride modified high density polyethylenes, anhydride modified low density polyethylenes and anhydride linear low density polyethylenes. Nonlimiting examples of materials suitable for use in forming a polyolefin layer include LDPEs, MDPEs, HDPEs, LLDPEs or combinations thereof.

Where a barrier layer is used, the barrier layer may be made from a material which is substantially impermeable to at least one of oxygen, nitrogen, carbon dioxide, water, and aroma. Nonlimiting examples of materials suitable for use in the barrier layer include vinyl alcohols, polyvinyl alcohols, nylons, polyesters, ethylene vinyl dichlorides, liquid crystal polymers, polyvinyl chlorides, polyvinylidene chlorides, modified polyolefins with barrier properties, polyacrylonitriles, acrylonitrile copolymers, polyacetals, cellophanes, or combinations thereof. Nonlimiting examples of materials suitable for use in forming a sealant layer include polypropylenes, plastomers, elastomers, EVAs, linear low density polyethylenes, ultra low density polyethylenes, functionalized polymers, and combinations thereof. Nonlimiting examples of suitable functionalized polymers include BYNEL® (products based on ethylene vinyl acetate, polyethylene, polypropylene, acid copolymers, and ethylene/acrylate copolymers) available from DuPont, POLYBOND® (maleic anhydride or acrylic acid grafted polyolefins) available from Uniroyal Chemical, ADMER (chemically modified polyolefins having functional groups) available from Mitsui Chemicals, Inc. Where a sealant layer is used in forming the fins, the sealant layer is typically located adjacent the opposing body panels 25, 26.

It is also contemplated that oxygen absorbers and/or oxygen scavengers may be included in any of the layers. Oxygen absorbers or oxygen scavengers are generally chemical or enzyme based. Chemical oxygen scavengers contemplated in the present invention include metallic reducing agents such as various ferrous compounds, powdered iron oxide and metallic platinum. Other chemical oxygen scavengers include non-metallic formulations such as those employing ascorbic acids (Vitamin C) and their associated salts and organometallic molecules that have a natural affinity for oxygen.

Where a multiple layered fin structure is used, the placement of the layers may vary. In other words, the layers may be placed in any suitable configuration or arrangement and any one or more layers may contain a cyclic olefin copolymer. The configuration of the layers for use in a multiple-layered fin structure may vary based upon a variety of factors including, but not limited to, customer requirement (s), the applications in which the reclosable fasteners may be used, the desired property(s) of the reclosable fasteners, cost, the processing equipment, and the like.

Figure 4:
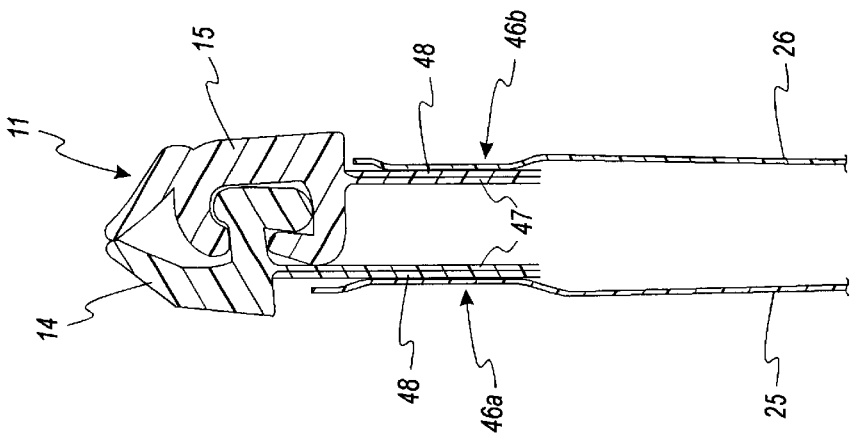
FIG. 4 is a sectional view of a fastener having fins comprising two layers according to one embodiment of the present invention.

Turning to FIG. 4, each of the fins 46a, 46b of fastener 11 comprises a first layer 47 and a second layer 48. The first and the second layers 47, 48 may be made of the same or different materials. The first layer 47 may comprise the same materials as described above in making the fins 16a, 16b and/or the profiles 14, 15 of the bag B in the form of a monolayer. In other words, the first layer 47 comprises a cyclic olefin copolymer and optionally comprises an additional polymer(s) as described above. The second layer 48 may be a tie layer, a polyolefin(s) layer, a barrier layer, or a sealant layer. As shown in FIG. 4, the second layer 48 may be connected to the opposing body panels 25, 26.

Numerous arrangements for fins having two layers are contemplated. For example, in one arrangement, the first layer 47 is made of cyclic olefin copolymer and the second layer 48 is made of a polyolefin such as LDPE, MDPE, HDPE, LLDPE, or a combination thereof. Alternatively, the first layer 47 may be made of a combination of a cyclic olefin copolymer and an additional polymer(s) as described above.

Figure 5:
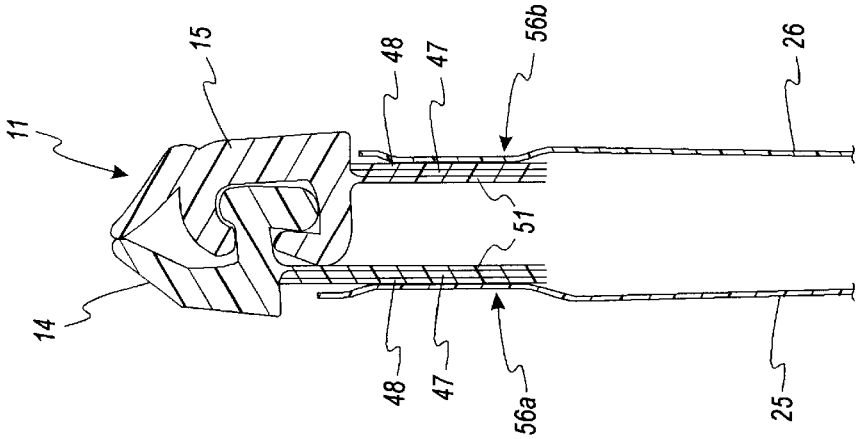
FIG. 5 is a sectional view of a fastener having fins comprising three layers according to a further embodiment of the present invention.

Referring to FIG. 5, the fins 56a, 56b of fastener 11 are similar to the fins 46a, 46b of FIG. 4 except that the fins further include a third layer 51. As shown in FIG. 5, the third layer 51 may be located on the interior of the bag such that the first layer 47 is located between the second layer 48 and the third layer 51. The third layer 51 of FIG. 5 may be made of similar materials as described above with respect to the first layer 47 or may be made of similar materials as described above with respect to the second layer 48.

Numerous arrangements for fins having three layers are contemplated. In one suitable three layer fin structure, the first layer 47 is made of a cyclic olefin copolymer, the second layer 48 is made of a polyolefin such as LDPE, MDPE, HDPE, LLDPE, or a combination thereof, and the third layer 51 is made from a polyolefin such as LDPE, MDPE, HDPE, LLDPE, or a combination thereof. Alternatively, the first layer 47 may be made of a combination of a cyclic olefin copolymer and an additional polymer (s) as described above.

In yet another suitable three layer arrangement, the first layer 47 may be made of a cyclic olefin copolymer and optionally an additional polymer(s), the second layer 48 may be a tie layer, and the third layer 51 may be made of a polyolefin(s). In a further suitable three layer arrangement, the first layer 47 may be made of a cyclic olefin copolymer and optionally an additional polymer(s), the second layer 48 may be a tie layer, and the third layer 51 may be a barrier layer.

The fins used in the present invention may also include a fourth and a fifth layer such as shown in FIGS. 6–7. Referring first to FIG. 6, the fins 66a, 66b of fastener 11 further include a fourth layer 61. As shown in FIG. 6, the fourth layer 61 may be located on the interior of the bag such that the first layer 47 is located between the second layer 48 and the third layer 51 and the fourth layer 61 is adjacent to the third layer 51. The fourth layer 61 of FIG. 6 may be made of similar materials as described above with respect to the first layer 47 or may be made of similar materials as described above with respect to the second layer 48.

Numerous arrangements for fins having four layers are contemplated. In one suitable four layer fin structure, the first layer 47 is made of a cyclic olefin copolymer, the second layer 48 is made of a polyolefin, the third layer 51 is made from a polyolefin, and the fourth layer 61 is a barrier layer. Alternatively, the first layer 47 may be made of a combination of a cyclic olefin copolymer and an additional polymer(s) as described above.

In another suitable four-layered arrangement, the first layer 47 is made from a polyolefin, the second layer 48 is a barrier layer, the third layer 51 is made from a cyclic olefin copolymer, and the fourth layer 61 is made from a polyolefin. Alternatively, the third layer 51 may be made of a combination of a cyclic olefin copolymer and an additional polymer(s) as described above.

Other four layered fin structures are contemplated in the present invention. In another suitable four-layered fin structure, the first layer 47 is made from a polyolefin, the second layer 48 is a tie layer, the third layer 51 is made from a cyclic olefin copolymer, and the fourth layer 61 is made from a polyolefin. In yet another suitable four-layered fin structure, the first layer 47 is a barrier layer, the second layer 48 is made from a polyolefin, the third layer 51 is a tie layer, and the fourth layer 61 is made from a cyclic olefin copolymer.

Referring to FIG. 7, the fins 76a, 76b of fastener 11 further include a fifth layer 71. As shown in FIG. 7, the fifth layer 71 may be located on the interior of the fins 76a, 76b such that the first layer 47 is located between the second layer 48 and the third layer 51, the fourth layer 61 is adjacent to the third layer 51, and the fifth layer 71 is adjacent to the second layer 48. The fifth layer 71 of FIG. 7 may be made of similar materials as described above with respect to the first layer 47 or may be made of similar materials as described above with respect to the second layer 48.

Various arrangements for fins having five layers are contemplated. In one suitable five-layered fin structure, the first layer 47 is made of a cyclic olefin copolymer, the second layer 48 is made of a polyolefin, the third layer 51 is made from a polyolefin, the fourth layer 61 is a barrier layer, and the fifth layer 71 is a barrier layer. Alternatively, the first layer 47 may be made of a combination of a cyclic olefin copolymer and an additional polymer(s) as described above.

Other five layered fin structures are contemplated in the present invention. In another suitable five-layered fin structure, the first layer 47 is a barrier layer, the second layer 48 is a tie layer, the third layer 51 is a tie layer, and the fourth layer 61 is made from a cyclic olefin copolymer, and the fifth layer 71 is made from a polyolefin.

It is also contemplated that additional layers may be added in forming the fins of the present invention. For example, six, seven, or more layered fins are contemplated in the present invention.

Although the fins for use in embodiments of the invention have been described in connection with those shown in FIGS. 3–7, the fins may be placed in numerous locations. It is contemplated that one or both of the fins may be placed on the exterior portion of the bag adjacent to one or both of the opposing body panels. For example, as shown in FIG. 8, fin 86a may be located on the interior of the bag such that fin 86a is located adjacent to the interior of the opposing body panel 25 and fin 86b may be located on the exterior of the bag such that fin 86b is located adjacent to the exterior of the opposing body panel 26. In an alternative embodiment, the fins may both be located on the exterior of the bag. For example, as shown in FIG. 9, fin 96a is located on the exterior of the bag such that fin 96a is located adjacent to the exterior of the opposing body panel 25 and fin 96b is located adjacent to the exterior of the opposing body panel 26. Whether the fins are placed on the exterior of the bag adjacent to the exterior of one or both of the opposing body panels and/or are placed on the interior of the bag adjacent to the interior of one or both of the opposing body panels, the fins may be in the form of a monolayer or a multiple-layered structure as described above.

It is also contemplated that the male profile may have more than one depending fin extending downward from the male profile and that that the female profile may have more than one depending fin extending downward from the female profile (not shown). In this embodiment, the fins may be in the form of a monolayer or a multiple-layered structure as described above. In this embodiment, the fins associated with the male profile may be located on the exterior of the bag and/or on the interior of the bag. In addition, the fins associated with the male profile may be located on the exterior of the bag and/or on the interior of the bag.

The fins, such as shown in FIGS. 4–9, may be formed by coextruding the multiple layers that form each fin. The fins may also be formed by other processes such as coating or laminating including extrusion laminating or adhesive laminating. The thicknesses of the fins may vary from generally about 2 mils to about 10 mils. The thicknesses of the fins are typically from about 4 mils to about 8 mils and more typically from about 5 mils to about 7 mils.

As discussed above, in a further embodiment of the invention, the profiles 14, 15 may also be formed of multiple layers. Profiles which are formed of two layers are depicted in FIG. 10. It is also contemplated that the profiles may have, for example, three, four, five, or more layers (not shown).

Where a multiple layered profile structure is used, at least one of the layers may comprise the same materials as described above in making the fins 16a, 16b and/or the profiles 14, 15 of the bag B in the form of a monolayer. In other words, at least one of the layers may comprise a cyclic olefin copolymer and may optionally comprise an additional polymer(s) as described above.

Nonlimiting examples of suitable additional layers that may be used in one or more of the layers in a multiple layered profile structure include a polyolefin(s) layer, a barrier layer, a tie layer, or a sealant layer. The materials which are selected for use in a profile structure having multiple layers may vary based on a variety of factors including, but not limited to, customer requirements, the applications in which the bags may be used, the desired properties of the bags, cost, and the like.

Where a multiple layered profile structure is used, the placement of the layers may vary. In other words, the layers may be placed in any suitable configuration or arrangement and any one or more layers may contain a cyclic olefin copolymer. The configuration of the layers for use in a multiple-layered profile structure may vary based upon a variety of factors including, but not limited to, customer requirement(s), the applications in which the reclosable fasteners may be used, the desired property(s) of the reclosable fasteners, cost, the processing equipment, and the like.

FIG. 10 shows a suitable fastener 111 for use in embodiments of the invention that includes a male profile 114 and a female profile 115. As shown in FIG. 10, each of the profiles 114, 115 comprises a first layer 106 and a second layer 108. The first and the second layer 106, 108 may be made of the same or different materials. The first layer 106 may comprise the same materials as described above in making the profiles and/or the fins of the bag in the form of a monolayer. In other words, the first layer 106 may comprise a cyclic olefin copolymer and may optionally comprise an additional polymer(s) as described above. The second layer 108 may be a polyolefin(s) layer, a barrier layer, a tie layer, or a sealant layer.

Numerous arrangements for profiles having two layers are contemplated. For example, in one arrangement, the first layer 106 may be made of a cyclic olefin copolymer and the second layer 108 may be made of a polyolefin such as LDPE, MDPE, HDPE, LLDPE, or a combination thereof. Alternatively, the first layer 106 may be made of a combination of a cyclic olefin copolymer and an additional polymer(s) as described above.

As discussed above, a three layered profile structure (not shown) is contemplated in the present invention. In one suitable three-layered profile embodiment, the first layer is made of a cyclic olefin copolymer, the second layer is made of a polyolefin, and the third layer is made from a polyolefin. Alternatively, the first layer may be made of a combination of a cyclic olefin copolymer and an additional polymer(s) as described above. Although a multitude of configurations are contemplated, the layer comprising the cyclic olefin copolymer is preferably the central layer.

The profiles, such as shown in FIG. 10, may be formed by coextruding the multiple layers that form each profile. The profiles may also be formed by other processes such as coating or laminating including extrusion laminating or adhesive laminating. The thicknesses of the profiles may vary from generally about 10 mils to about 45 mils. The thicknesses of the profiles are typically from about 15 mils to about 30 mils.

Although the profiles for use in embodiments of the invention have been described in connection with those shown in FIGS. 1–10, additional male and female profiles may be used in embodiments of the invention. Any interlocking male and female profile having complementary cross-sectional shapes may be used. The alternative male and female profiles which may be used in embodiments of the invention may use an auxiliary slider mechanism or may have a press to close type fastener which may be opened and closed either by finger pressure or an auxiliary squeezing device other than an auxiliary slider mechanism.

Figure 13:
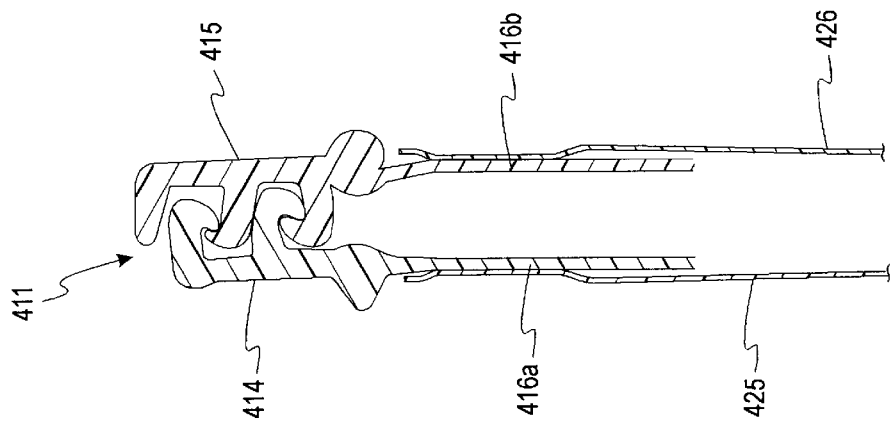
FIG. 13 is a cross sectional view of a fastener constructed in accordance with a still further embodiment of the invention.
Figure 12:
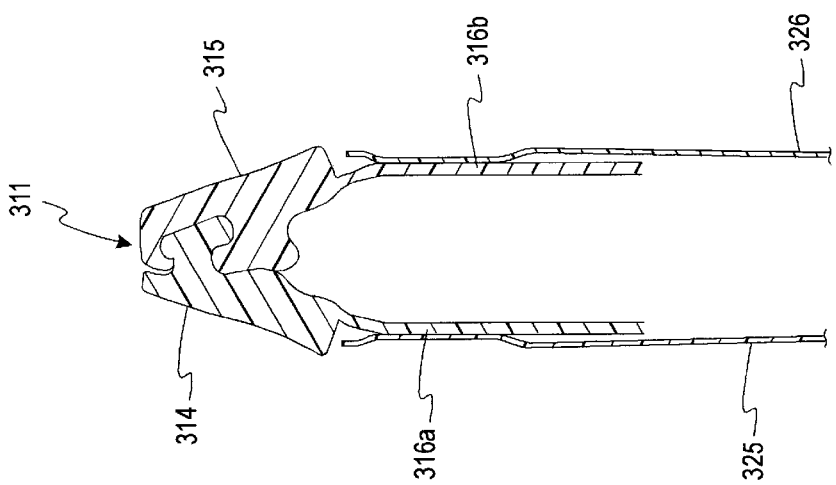
FIG. 12 is a cross sectional view of a fastener constructed in accordance with a further embodiment of the invention.
Figure 11:
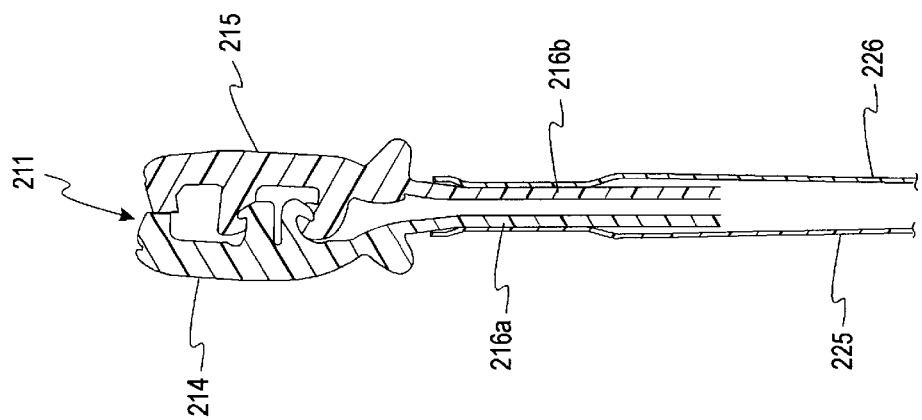
FIG. 11 is a cross sectional view of a fastener constructed in accordance with another embodiment of the invention.

Nonlimiting examples of additional cross-sectional shapes of interlocking male and female profiles which are suitable for use in embodiments of the invention are shown in FIGS. 11–13. FIG. 11 shows a suitable fastener 211 for use in embodiments of the invention that includes a male profile 214 and a female profile 215. FIG. 12 shows another example of a suitable fastener 311 for use in embodiments of the invention that includes a male profile 314 and a female profile 315. FIG. 13 shows yet another example of a suitable fastener 411 for use in embodiments of the invention that includes a male profile 414 and a female profile 415.

It is contemplated that additional materials may be added in forming the fins and/or the profiles. These materials include various fillers such as clay, talc, mica, calcium carbonate, wood flour, glass sphere, glass fibers, pigments, and nanoclays which may be more cost effective. These materials may be blended with other materials in the formation of the fins and/or the profiles. These materials may be added in a sufficient amount so that the fins and/or the profiles have the properties which are desired for a given application.

EXAMPLE 1

Top Retention Test

Three bags (Bags 2–4) were formed having slider tracks with profiles composed of TOPAS® 8007 and polyethylene. The profiles contained 10, 20, and 40 weight percent of TOPAS® 8007 respectively. A fourth control bag (Bag 1) having a slider track with a profile composed of polyethylene was also formed.

The tracks of Bags 1–4 were tested in a SINTECH® tensile strength tester available from MTS Systems in Cary, N.C. to measure the top retention of the slider (i.e., the force required to pull the slider off of the top of a bag) using the following procedure:

1. The bag was placed into the tensile strength tester so that the slider adapter was located in the top jaw of the equipment;
2. 4" were cut from the top of the bag;
3. The slider was moved near the center of the track;
4. The slider was moved into the slider adapter and centered in the slider adapter;
5. The film was placed into the bottom jaw of the tensile strength tester;
6. The jaws of the tensile strength tester were closed; and
7. The force to pull the slider off of the track was measured.

Steps 1–7 were run five (5) times for each track sample and then averaged. The results shown below in Table A demonstrate that the top retention of the slider increased with increasing weight percents of TOPAS® in the profile.

TABLE A

| Bag No. | Weight % of TOPAS® 8007 in Profile | Weight % of Polyethylene in Profile[1] | Top Retention (lbs) |
| --- | --- | --- | --- |
| 1 (Control) | 0 | 100 | 17.1 |
| 2 | 10 | 90 | 18.6 |
| 3 | 20 | 80 | 20.7 |
| 4 | 40 | 60 | 22.4 |

[1]This weight percent included additional additives not exceeding approximately 1–2 wt. %. The additional additives included a white pigment and a slip and process aid available from Ampacet in Tarrytown, New York.

EXAMPLE 2

Track Open Force Test

The slider tracks of Bags 1–4 were tested in a SINTECH® tensile strength tester to measure the amount of force required to open the track (i.e., the amount of force required to pull the male and female profile apart to open the track by pulling on the fins) using the following procedure:

1. The jaw separation on the tensile tester was set at 2";
2. The film containing the male profile was placed into the top jaw of the tensile tester and the film containing the female profile was placed into the bottom jaw of the tensile tester;
3. The jaws were closed; and
4. The fins of each track sample were pulled until the track opened (i.e., until the male and female profile pulled apart).

Steps 1–4 were run five (5) times for each track sample and then averaged. The standard deviation was also calculated for each track sample. The results shown below in Table B demonstrate that the open force of the slider increased with higher weight percents (e.g., 40%) of TOPAS® in the profile.

TABLE B

| Bag No. | Weight % of TOPAS ® 8007 in Profile | Weight % of Polyethylene in Profile[1] | Open Force (lbs) |
| --- | --- | --- | --- |
| 1 (Control) | 0 | 100 | 16.0 |
| 2 | 10 | 90 | 15.1 |
| 3 | 20 | 80 | 15.1 |
| 4 | 40 | 60 | 23.7 |

[1]This weight percent included additional additives not exceeding approximately 1–2 wt. %. The additional additives included a white pigment and a slip and process aid available from Ampacet in Tarrytown, New York.

EXAMPLE 3
Dead Fold Retention Test

The slider tracks of Bags 1–4 were tested on a dead fold tester having a minimum of 40 psi air supply manufactured by Aurnou Gage, Inc. in Rochester, N.Y. to measure the dead fold or crease retention of the track (i.e., the ability of the track to maintain its position once the track has been bent or folded) using the following procedure:

1. The fins of each sample were cut from the track;
2. The track was separated;
3. The male and female sides of the track were cut to 7" in length;
4. The track was placed smooth side down into the grooved portion of the dead fold tester so that the edge of the track was perpendicular to and touching the end stop of the dead fold tester;
5. The right clamp of the dead fold tester was tightened;
6. The opposite edge of the track was folded over to the right edge of the dead fold tester guides;
7. The left clamp of the dead fold tester was tightened;
8. A weight was lowered by depressing the toggle switch on the dead fold tester;
9. A timer was started once the weight was lying on the track;
10. The weight was released after thirty (30) seconds;
11. The track was allowed to relax for thirty (30) seconds; and
12. The angle formed by the dead fold was measured.

Steps 1–12 were run thirty (30) times for each track sample and then averaged. The standard deviation was also calculated for each track sample. The results shown below in Table C demonstrate that the dead fold angle improved (i.e., got smaller) with increasing weight percents of TOPAS® in the profile. These results also show that increasing the weight percents of TOPAS® in the profile improved the ability of the track to maintain its position once it has been bent or folded.

EXAMPLE 4
Track Shrinkage Test

Three bags (Bags 6–8) were formed having slider tracks with profiles composed of TOPAS® 6013 and polyethylene. The profiles were composed of 10, 20, and 40 weight percent of TOPAS® 6013 respectively. Two bags (Bags 3–4) having slider tracks with profiles as described in Example 1 above were also formed. A sixth control bag (Bag 5) having a slider track with a profile composed of polyethylene was also formed.

The profiles of each of the six track samples were separated and labeled as male or female profile. The profiles were then cut using a 100 mm×100 mm template. Four samples of the six male and female profiles were cut.

A heated fluidized bath of aluminum oxide was used to measure the unrestrained shrinkage characteristics of the profiles of each of the six track samples. The heated fluidized bath used was a TECHNE® SBS2 manufactured by Techne Corporation in Princeton, N.J. and was capable of 80 standard cubic feet per hour with a minimum of 40 psi air supply. A temperature controller having a temperature probe capable of maintaining the temperature of the fluidized bath at±2° F. was used. The temperature controller used was a TECHNE® TC8D manufactured by Techne Corporation in Princeton, N.J.

The instruments were prepared according to the following procedure:

1. The wires were attached to the temperature controller from the fluidized bath;
2. The temperature probe was inserted into the receptacle on the side of the fluidized bath so that the tip of the probe was in the middle of the bath;
3. The level of aluminum oxide in the bath was checked to ensure it measured approximately 2" from the top edge of the bath;
4. The fluidized bath was connected to a minimum 40 psi air supply;
5. The airflow regulator was set to 80 standard cubic feet per hour (scfh) and was adjusted slightly as needed to prevent the aluminum oxide from overflowing;
6. The fluidized bath dial was set to maximum setting of 10;
7. The temperature regulator was turned on and set at a temperature of 240° F. although the temperature could vary depending on the components of the sample being tested for shrinkage;
8. The 12"×½" rod extending from the ringstand over the bath was adjusted so the handle of the wire mesh sample cage rested on the rod and the top of the cage was positioned at least ½" below the surface of the aluminum oxide bath; and
9. The timer was set for 60 seconds where applicable.

TABLE C

| Bag No. | Weight % of TOPAS ® 8007 in Profile | Weight % of Polyethylene in Profile[1] | Dead Fold Angle (°) of the Male Profile | Dead Fold Angle (°) of the Female Profile |
| --- | --- | --- | --- | --- |
| 1 (Control) | 0 | 100 | 170 | 170 |
| 2 | 10 | 90 | 127 | 114 |
| 3 | 20 | 80 | 83 | 80 |
| 4 | 40 | 60 | 56 | 55 |

[1]This weight percent included additional additives not exceeding approximately 1–2 wt. %. The additional additives included a white pigment and a slip and process aid available from Ampacet in Tarrytown, New York.

The four samples of the six male and female profiles were tested on the heated fluidized bath of aluminum oxide to measure the unrestrained shrinkage characteristics of the profiles (i.e., the amount each profile shrinks when raised in a relaxed state to a predetermined temperature for a set amount of time) using the procedure set forth below.

1. The temperature controller was checked to make sure the fluidized bath was set at the specified temperature of 240° F.±2° F.;
2. The twenty four samples (four sets of the six male and female profiles) were placed in the sample cage;
3. The timer was started;
4. The sample cage was smoothly immersed into the fluidized bath so the samples were at least ½" below the upper portion of the aluminum oxide;
5. The sample cage was removed after a 60 second submersion;
6. The excess aluminum oxide was poured off of the samples;
7. The samples were removed from the cage, laid on a flat surface, and allowed to cool; and
8. Excess aluminum oxide was brushed off of the samples and any curling of the samples was smoothed out.

Since the original dimension of the samples was exactly 100 mm, the percent shrinkage was read by placing the 100 mm mark at the end of the sample and reading the percent change in millimeters from the opposite parallel edge. Where a material became elongated, it was recorded as a negative shrinkage value. Where a material became shortened, it was recorded as a positive shrinkage value. The average percent shrinkage of the four sets of six male and female profiles was recorded and the standard deviation was calculated. The results are shown below in Table D.

1. A 25" piece of track was cut;
2. The track was placed flat on a board with the profile located against the dowel pins in the board which were spaced 24" apart; and
3. The amount of curvature was measured off a scale in the center of the board in 1/32". In particular, the distance from zero to the edge of the profile was recorded.

The results shown below in Table E show that the curvature decreased (i.e., became straighter) with increased weight percents of TOPAS® in the profile.

TABLE E

| Bag No. | Weight % of TOPAS® 6013 in Profile | Weight % of Polyethylene in Profile[1] | Curvature of the Track |
|---|---|---|---|
| 9 (Control) | 0 | 100 | +36/32" |
| 10 | 5 | 95 | +29/32" |
| 11 | 10 | 90 | +16/32" |
| 12 | 15 | 85 | +3/32" |

[1]This weight percent included additional additives not exceeding approximately 1–2 wt. %. The additional additives included a white pigment and a slip and process aid available from Ampacet in Tarrytown, New York.

EXAMPLE 6
Seal Strength Test

Three films (Films 2–4) having a thickness of 1 mil were made with varying weight percents of TOPAS® 6013 in LLDPE. Films 2–4 were composed of 5, 10, and 20 weight percent of TOPAS® 6013 respectively. A fourth control film (Film 1) composed of LLDPE having a thickness of 1 mil was also formed.

Films 1–4 were cut into 10" long and 1" wide pieces. Two 10"×1" pieces of each of the four films were glued together

TABLE D

| Bag No. | Weight % of TOPAS® in Profile | | Weight % of Polyethylene In Profile | | Percent Shrinkage of the Profile (%) | |
|---|---|---|---|---|---|---|
| | Type | Weight % TOPAS® | Type | Weight % Polyethylene[1] | Male | Female |
| 5 | Control | 0 | Control | 100 | 53.0 | 52.7 |
| 3 | 8007 | 20 | 8007 | 80 | 6.5 | 6.9 |
| 4 | 8007 | 40 | 8007 | 60 | 8.3 | 7.1 |
| 6 | 6013 | 10 | 6013 | 90 | 1.7 | 1.0 |
| 7 | 6013 | 20 | 6013 | 80 | 0.4 | 0.1 |
| 8 | 6013 | 40 | 6013 | 60 | 0.2 | 0.1 |

[1]This weight percent included additional additives not exceeding approximately 1–2 wt. %. The additional additives included a white pigment and a slip and process aid available from Ampacet in Tarrytown, New York.

The results shown above in Table D demonstrate that the addition of TOPAS® 8007 or TOPAS® 6013 to the profiles reduced the shrinkage of the profiles.

EXAMPLE 5
Track Curvature Test

Three bags (Bags 10–12) were formed having slider tracks with profiles composed of TOPAS® 6013 and polyethylene. The profiles were composed of 5, 10, and 15 weight percent of TOPAS® 6013 respectively. A fourth bag (Bag 9) having a slider track with a profile composed of polyethylene was also formed.

The track curvature (i.e., how much the track is bent in the same plane as the fin and the profile) of each of the four track samples was measured using the following procedure:

using a THELLER® HT heatsealer available from Theller Engineering in Petaluma, Calif. using the following sealing procedure:

1. The aluminum hot seal bars on the top and the bottom of the THELLER® HT heatsealer were set to the following temperatures: 250° F., 275° F., 300° F., 325° F., and 350° F.;
2. The top seal bar of the THELLER® HT heatsealer was covered with 5 mils of a Teflon/glass cloth tape;
3. The bottom seal bar of the THELLER® HT heatsealer, which had a 26 mil silicone rubber pad, was covered with 5 mils of a Teflon/glass cloth tape;

4. The jaw closure was sealed on the two 10"×1" pieces of each test sample for 1500 msec at a sealing unit pressure of 60 psig; and 5. The two 10"×1" pieces of each test sample were cooled in still room air at 72° F.

The web tension both during and after sealing was almost zero (i.e., 0.5 gm).

Tensile tests were then performed on the four glued film test samples using a SINTECH® tensile strength tester in peel mode (T-configuration or method). The full 1" width of each test sample was clamped into the upper and lower air actuated jaws of the tensile strength tester and subjected to the following test conditions:

1. Near zero initial tension in the sample;
2. 2" initial jaw separation; and
3. 20 in./min jaw separation speed.

The results of the tensile tests shown below in Table F demonstrate that the heat seal strength (shown in pounds/linear inch (pli)) (i.e., how much force a seal will withstand before breaking when stretched) of the films increased at all heat seal temperatures with increasing weight percents of TOPAS® in the film.

TABLE F

| Film # | Weight % of TOPAS® 6013 in the Film | Weight % of LLDPE in the Film | Seal Bar Temperature (° F.) | | | | |
|---|---|---|---|---|---|---|---|
| | | | 250 | 275 | 300 | 325 | 350 |
| | | | Heat Seal Strength (pli) | | | | |
| 1 (control) | 0 | 100 | 2.334 | 2.055 | 2.397 | 2.166 | 1.948 |
| 2 | 5 | 95 | 2.734 | 3.043 | 2.881 | 2.52 | 2.738 |
| 3 | 10 | 90 | 3.578 | 3.506 | 3.558 | 3.555 | 4.913 |
| 4 | 20 | 80 | 4.557 | 4.443 | 4.123 | 4.227 | 6.083 |

EXAMPLE 7
Oil Release Test

Two films (Films 6–7) having a thickness of 2 mils were made containing 20 and 50 weight percent of TOPAS® 6013 in LLDPE respectively. A third control film (Film 5) composed of LLDPE having a thickness of 2 mils was also formed.

An oil residue test for cheese was performed on the three films. In particular, one gram of sliced cheese was placed on a 5×5" piece of each of the three films and heated in a microwave for 30 seconds. The melted cheese which remained on each of the three films was cooled to room temperature and removed with a flipper. The percentage of the cheese which remained on each of the three films was then calculated. The results are shown below in Table G.

TABLE G

| Film # | Weight % of TOPAS® 6013 in the Film | Weight % of LLDPE in the Film | % Cheese Remaining on Film After Heating, Cooling, and Removal Steps |
|---|---|---|---|
| 5 (control) | 0 | 100 | 6.0 |
| 6 | 20 | 80 | 1.5 |
| 7 | 50 | 50 | 0.8 |

The results shown above in Table G demonstrate that the addition of TOPAS® to the films improved its oil releasing properties.

EXAMPLE 8

Modulus Enhancement Test

Films of varying thicknesses (Films 2–4, 6, and 9–13) were made with varying weight percents of TOPAS® 6013 in LLDPE as shown below in Table H. Control films (Films 1, 5, and 8) made of LLDPE at varying thicknesses were also formed.

The films were tested to measure the machine direction modulus (i.e., the initial resistance of a material to stretching). The results shown below in Table H demonstrate that the addition of TOPAS® to LLPDE films improved the machine direction modulus of the film as measured by ASTM D882.

TABLE H

| Film # | Film thickness (mil) | Weight % of TOPAS® 6013 | Weight % of LLDPE | Machine Direction Modulus (psi) |
|---|---|---|---|---|
| 8 (Control) | 0.5 | 0 | 100 | 32666 |
| 9 | 0.5 | 5 | 95 | 55743 |
| 10 | 0.5 | 10 | 90 | 71722 |
| 11 | 0.5 | 20 | 80 | 102524 |
| 1 (Control) | 1 | 0 | 100 | 33963 |
| 2 | 1 | 5 | 95 | 44557 |
| 3 | 1 | 10 | 90 | 58804 |
| 4 | 1 | 20 | 80 | 90947 |
| 5 (Control) | 2 | 0 | 100 | 32256 |
| 12 | 2 | 5 | 95 | 42459 |
| 13 | 2 | 10 | 90 | 63474 |
| 6 | 2 | 20 | 80 | 92655 |

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A fastener for a plastic bag comprising:
   a male track including a male profile and a first fin, the first fin extending from the male profile; and a female track including a female profile and a second fin, the second fin extending from the female profile, at least one of the first and second fins comprising a cyclic olefin copolymer, the cyclic olefin copolymer having a glass transition temperature, $T_g$, of greater than about 20° C. as determined by ASTM D3418.

2. The fastener of claim 1, wherein at least one of the first and second fins comprise at least a second polymer selected from a polyolefinic resin, an engineering resin, and a combination thereof.

3. The fastener of claim 2, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

4. The fastener of claim 3, wherein at least one of the first and second fins further comprise an alkenyl aromatic polymer.

5. The fastener of claim 4, wherein the alkenyl aromatic polymer is polystyrene, an ethylene-styrene interpolymer, or a combination thereof.

6. The fastener of claim 2, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

7. The fastener of claim 2, wherein at least one of the first and second fins comprise from about 1 to about 99 wt. % of the cyclic olefin copolymer and from about 1 to about 99 wt. % of the second polymer.

8. The fastener of claim 7, wherein at least one of the first and second fins comprise from about 1 to about 40 wt. % of the cyclic olefin copolymer and from about 60 to about 99 wt. % of the second polymer.

9. The fastener of claim 1, wherein the cyclic olefin copolymer comprises from about 10 to about 90 mol. % of norbornene.

10. The fastener of claim 9, wherein the cyclic olefin copolymer comprises from about 20 to about 70 mol. % of norbornene.

11. The fastener of claim 10, wherein the cyclic olefin copolymer comprises from about 35 to about 65 mol. % of norbornene.

12. The fastener of claim 1, wherein the glass transition temperature, $T_g$, of the cyclic olefin copolymer is greater than about 50° C. as determined by ASTM D3418.

13. The fastener of claim 12, wherein the glass transition temperature, $T_g$, of the cyclic olefin copolymer is greater than about 75° C. as determined by ASTM D3418.

14. The fastener of claim 13, wherein the glass transition temperature, $T_g$, of the cyclic olefin copolymer is greater than about 100° C. as determined by ASTM D3418.

15. The fastener of claim 1, wherein at least one of the first and second fins further comprise a filler selected from clay, talc, mica, calcium carbonate, wood flour, glass sphere, glass fibers, pigments, and nanoclays.

16. The fastener of claim 1, wherein at least one of the first and second fins further comprise a filler selected from talc, calcium carbonate, and nanoclays.

17. The fastener of claim 1, wherein the fastener is closed using finger pressure or an auxiliary squeezing device.

18. The fastener of claim 1, wherein the fastener is closed using an auxiliary slider mechanism.

19. A fastener for a plastic bag comprising:
a male track including a male profile and a first fin, the first fin extending from the male profile; and
a female track including a female profile and a second fin, the second fin extending from the female profile, at least one of the first and second fins comprising a cyclic olefin copolymer and at least a second polymer selected from a polyolefinic resin, an engineering resin, and a combination thereof, the cyclic olefin copolymer having a glass transition temperature, $T_g$, of greater than about 20° C. as determined by ASTM D3418.

20. The fastener of claim 19, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

21. The fastener of claim 20, wherein at least one of the first and second fins further comprise an alkenyl aromatic polymer.

22. The fastener of claim 19, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

23. The fastener of claim 19, wherein at least one of the first and second fins comprise from about 1 to about 99 wt. % of the cyclic olefin copolymer and from about 1 to about 99 wt. % of the second polymer.

24. The fastener of claim 23, wherein at least one of the first and second fins comprise from about 1 to about 40 wt. % of the cyclic olefin copolymer and from about 60 to about 99 wt. % of the second polymer.

25. The fastener of claim 19, wherein the cyclic olefin copolymer comprises from about 10 to about 90 mol. % of norbornene.

26. The fastener of claim 25, wherein the cyclic olefin copolymer comprises from about 20 to about 70 mol. % of norbornene.

27. The fastener of claim 26, wherein the cyclic olefin copolymer comprises from about 35 to about 65 mol. % of norbornene.

28. The fastener of claim 19, wherein the glass transition temperature, $T_g$, of the cyclic olefin copolymer is greater than about 50° C. as determined by ASTM D3418.

29. The fastener of claim 28, wherein the glass transition temperature, $T_g$, of the cyclic olefin copolymer is greater than about 75° C. as determined by ASTM D3418.

30. The fastener of claim 29, wherein the glass transition temperature, $T_g$, of the cyclic olefin copolymer is greater than about 100° C. as determined by ASTM D3418.

31. The fastener of claim 19, wherein at least one of the first and second fins further comprise a filler selected from clay, talc, mica, calcium carbonate, wood flour, glass sphere, glass fibers, pigments, and nanoclays.

32. The fastener of claim 19, wherein the fastener is closed using finger pressure or an auxiliary squeezing device.

33. The fastener of claim 19, wherein the fastener is closed using an auxiliary slider mechanism.

34. A fastener for a plastic bag comprising:
a male track including a male profile and a first fin, the first fin extending from the male profile; and
a female track including a female profile and a second fin, the second fin extending from the female profile, the first fin includes at least a first layer and a second layer and the second fin includes at least a third layer and a fourth layer, the first and third layers comprising a cyclic olefin copolymer, the cyclic olefin copolymer having a glass transition temperature, $T_g$, of greater than about 20° C. as determined by ASTM D3418, the second and fourth layers are selected from a tie layer, a polyolefin layer, a barrier layer, and a sealant layer.

35. The fastener of claim 34, wherein at least one of the first and third layers further comprise at least a second polymer selected from a polyolefinic resin, an engineering resin, and a combination thereof.

36. The fastener of claim 35, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

37. The fastener of claim 35, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

38. A fastener for a plastic bag comprising:
a male track including a male profile and a first fin, the first fin extending from the male profile; and
a female track including a female profile and a second fin, the second fin extending from the female profile, at least one of the male and female profiles comprising a cyclic olefin copolymer, the cyclic olefin copolymer having a glass transition temperature, $T_g$, of greater than about 20° C. as determined by ASTM D3418.

39. The fastener of claim 38, wherein at least one of the male and female profiles comprise at least a second polymer selected from a polyolefinic resin, an engineering resin, and a combination thereof.

40. The fastener of claim 39, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

41. The fastener of claim 40, wherein at least one of the male and female profiles further comprise an alkenyl aromatic polymer.

42. The fastener of claim 41, wherein the alkenyl aromatic polymer is polystyrene, an ethylene-styrene interpolymer, or a combination thereof.

43. The fastener of claim 39, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

44. The fastener of claim 39, wherein at least one of the male and female profiles comprise from about 1 to about 99 wt. % of the cyclic olefin copolymer and from about 1 to about 99 wt. % of the second polymer.

45. The fastener of claim 44, wherein at least one of the male and female profiles comprise from about 1 to about 40 wt. % of the cyclic olefin copolymer and from about 60 to about 99 wt. % of the second polymer.

46. The fastener of claim 38, wherein the cyclic olefin copolymer comprises from about 10 to about 90 mol. % of norbornene.

47. The fastener of claim 46, wherein the cyclic olefin copolymer comprises from about 20 to about 70 mol. % of norbornene.

48. The fastener of claim 47, wherein the cyclic olefin copolymer comprises from about 35 to about 65 mol. % of norbornene.

49. The fastener of claim 38, wherein the glass transition temperature, $T_g$, of the cyclic olefin copolymer is greater than about 50° C. as determined by ASTM D3418.

50. The fastener of claim 49, wherein the glass transition temperature, $T_g$, of the cyclic olefin copolymer is greater than about 75° C. as determined by ASTM D3418.

51. The fastener of claim 50, wherein the glass transition temperature, $T_g$, of the cyclic olefin copolymer is greater than about 100° C. as determined by ASTM D3418.

52. The fastener of claim 38, wherein at least one of the male and female profiles further comprise a filler selected from clay, talc, mica, calcium carbonate, wood flour, glass sphere, glass fibers, pigments, and nanoclays.

53. The fastener of claim 38, wherein the fastener is closed using finger pressure or an auxiliary squeezing device.

54. The fastener of claim 38, wherein the fastener is closed using an auxiliary slider mechanism.

55. A fastener for a plastic bag comprising:
a male track including a male profile and a first fin, the first fin extending from the male profile; and
a female track including a female profile and a second fin, the second fin extending from the female profile, at least one of the male and female profiles comprising a cyclic olefin copolymer and at least a second polymer selected from a polyolefinic resin, an engineering resin, and a combination thereof, the cyclic olefin copolymer having a glass transition temperature, $T_g$, of greater than about 20° C. as determined by ASTM D3418.

56. The fastener of claim 55, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

57. The fastener of claim 56, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

58. The fastener of claim 55, wherein at least one of the male and female profiles comprise from about 1 to about 99 wt. % of the cyclic olefin copolymer and from about 1 to about 99 wt. % of the second polymer.

59. The fastener of claim 58, wherein at least one of the male and female profiles comprise from about 1 to about 40 wt. % of the cyclic olefin copolymer and from about 60 to about 99 wt. % of the second polymer.

60. The fastener of claim 55, wherein the cyclic olefin copolymer comprises from about 10 to about 90 mol. % of norbornene.

61. The fastener of claim 60, wherein the cyclic olefin copolymer comprises from about 20 to about 70 mol. % of norbornene.

62. The fastener of claim 61, wherein the cyclic olefin copolymer comprises from about 35 to about 65 mol. % of norbornene.

63. The fastener of claim 55, wherein the glass transition temperature, $T_g$, of the cyclic olefin copolymer is greater than about 50° C. as determined by ASTM D3418.

64. The fastener of claim 63, wherein the glass transition temperature, $T_g$, of the cyclic olefin copolymer is greater than about 75° C. as determined by ASTM D3418.

65. The fastener of claim 55, wherein at least one of the male and female profiles further comprise a filler selected from clay, talc, mica, calcium carbonate, wood flour, glass sphere, glass fibers, pigments, and nanoclays.

66. The fastener of claim 55, wherein the fastener is closed using finger pressure or an auxiliary squeezing device.

67. The fastener of claim 55, wherein the fastener is closed using an auxiliary slider mechanism.

68. A fastener for a plastic bag comprising:
   a male track including a male profile and a first fin, the first fin extending from the male profile; and
   a female track including a female profile and a second fin, the second fin extending from the female profile, the male profile includes at least a first layer and a second layer and the female profile includes at least a third layer and a fourth layer, the first and third layers comprising a cyclic olefin copolymer, the cyclic olefin copolymer having a glass transition temperature, $T_g$, of greater than about 20° C. as determined by ASTM D3418, the second and fourth layers are selected from a tie layer, a polyolefin layer, a barrier layer, and a sealant layer.

69. The fastener of claim 68, wherein the first and third layers further comprise at least a second polymer selected from a polyolefinic resin, an engineering resin, and a combination thereof.

70. The fastener of claim 69, wherein the polyolefinic resin is selected from low density polyethylenes, linear low density polyethylenes, high density polyethylenes, medium density polyethylenes, polypropylenes, plastomers, plastomers, elastomers, ethylene vinyl acetates, ethyl methacrylates, polymethylpentene copolymers, polyisobutylenes, polyolefin ionomers, and combinations thereof.

71. The fastener of claim 69, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

72. A fastener for a plastic bag comprising:
   a male track including a male profile; and
   a female track including a female profile, at least one of the male and female profiles comprising a cyclic olefin copolymer, the cyclic olefin copolymer having a glass transition temperature, $T_g$, of greater than about 20° C. as determined by ASTM D3418.

73. A fastener for a plastic bag comprising:
   a male track including a male profile; and
   a female track including a female profile, at least one of the male and female profiles comprising a cyclic olefin copolymer and at least a second polymer selected from a polyolefinic resin, an engineering resin, and a combination thereof, the cyclic olefin copolymer having a glass transition temperature, $T_g$, of greater than about 20° C. as determined by ASTM D3418.

74. A fastener for a plastic bag comprising:
   a male track including a male profile; and
   a female track including a female profile, the male profile includes at least a first layer and a second layer and the female profile includes at least a third layer and a fourth layer, the first and third layers comprising a cyclic olefin copolymer, the cyclic olefin copolymer having a glass transition temperature, $T_g$, of greater than about 20° C. as determined by ASTM D3418, the second and fourth layers are selected from a tie layer, a polyolefin layer, a barrier layer, and a sealant layer.

75. A fastener for a plastic bag comprising:
   a male track including a male profile and a first fin, the first fin extending from the male profile; and
   a female track including a female profile and a second fin, the second fin extending from the female profile, at least one of the male and female profiles comprising a cyclic olefin copolymer and at least one of the first and second fins comprising a cyclic olefin copolymer, the cyclic olefin copolymer having a glass transition temperature, $T_g$, of greater than about 20° C. as determined by ASTM D3418.

76. The fastener of claim 75, wherein at least one of the male and female profiles further comprise at least a second polymer selected from a polyolefinic resin, an engineering resin, and a combination thereof.

77. The fastener of claim 76, wherein the polyolefinic resin is selected from low density polyethylenes, linear low density polyethylenes, high density polyethylenes, medium density polyethylenes, polypropylenes, plastomers, plastomers, elastomers, ethylene vinyl acetates, ethyl methacrylates, polymethylpentene copolymers, polyisobutylenes, polyolefin ionomers, and combinations thereof.

78. The fastener of claim 76, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

79. The fastener of claim 75, wherein at least one of the male and female fins further comprise at least a second polymer selected from a polyolefinic resin, an engineering resin, and a combination thereof.

80. The fastener of claim 79, wherein the polyolefinic resin is selected from low density polyethylenes, linear low density polyethylenes, high density polyethylenes, medium density polyethylenes, polypropylenes, plastomers, plastomers, elastomers, ethylene vinyl acetates, ethyl methacrylates, polymethylpentene copolymers, polyisobutylenes, polyolefin ionomers, and combinations thereof.

81. The fastener of claim 80, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

82. A polymeric bag comprising:
   first and second opposing body panels fixedly connected to each other along a pair of sides and a bottom bridging the pair of sides;
   a reclosable fastener extending along a mouth formed opposite the bottom, the fastener including a pair of interlocking flexible plastic tracks, the plastic tracks including a male track including a male profile and a first fin, the first fin extending from the male profile; and a female track including a female profile and a second fin, the second fin extending from the female profile, at least one of the first and second fins comprising a cyclic olefin copolymer, the cyclic olefin copolymer having a glass transition temperature, $T_g$, of greater than about 20° C. as determined by ASTM D3418; and
   a slider slidably mounted to the fastener for movement between a closed position and an open position.

83. The bag of claim 82, wherein at least one of the first and second fins comprise at least a second polymer selected from a polyolefinic resin, an engineering resin, and a combination thereof.

84. The bag of claim 83, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

85. The bag of claim 84, wherein at least one of the first and second fins further comprise an alkenyl aromatic polymer.

86. The bag of claim 85, wherein the alkenyl aromatic polymer is polystyrene, an ethylene-styrene interpolymer, or a combination thereof.

87. The bag of claim 83, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

88. The bag of claim 83, wherein at least one of the first and second fins comprise from about 1 to about 99 wt. % of the cyclic olefin copolymer and from about 1 to about 99 wt. % of the second polymer.

89. The bag of claim 88, wherein at least one of the first and second fins comprise from about 1 to about 40 wt. % of the cyclic olefin copolymer and from about 60 to about 99 wt. % of the second polymer.

90. The bag of claim 83, wherein the cyclic olefin copolymer comprises from about 10 to about 90 mol. % of norbornene.

91. The bag of claim 90, wherein the cyclic olefin copolymer comprises from about 20 to about 70 mol. % of norbornene.

92. The bag of claim 91, wherein the cyclic olefin copolymer comprises from about 35 to about 65 mol. % of norbornene.

93. The bag of claim 82, wherein the glass transition temperature, $T_g$, of the cyclic olefin copolymer is greater than about 50° C. as determined by ASTM D3418.

94. The bag of claim 93, wherein the glass transition temperature, $T_g$, of the cyclic olefin copolymer is greater than about 75° C. as determined by ASTM D3418.

95. The bag of claim 82, wherein at least one of the first and second fins further comprise a filler selected from clay, talc, mica, calcium carbonate, wood flour, glass sphere, glass fibers, pigments, and nanoclays.

96. The bag of claim 82, wherein the bottom is formed by folding the first and second opposing body panels.

97. The bag of claim 82, wherein the first and second opposing body panels are sealed after being initially separated so as to form the pair of sides and the bottom.

98. The bag of claim 82, wherein the bottom and one of the sides are sealed after initially folding the first and second opposing body panels so as to form a side fold.

99. A polymeric bag comprising:
first and second opposing body panels fixedly connected to each other along a pair of sides and a bottom bridging the pair of sides;
a reclosable fastener extending along a mouth formed opposite the bottom, the fastener including a pair of interlocking flexible plastic tracks, the plastic tracks including a male track including a male profile and a first fin, the first fin extending from the male profile; and a female track including a female profile and a second fin, the second fin extending from the female profile, at least one of the male and female profiles comprising a cyclic olefin copolymer, the cyclic olefin copolymer having a glass transition temperature, $T_g$, of greater than about 20° C. as determined by ASTM D3418; and
a slider slidably mounted to the fastener for movement between a closed position and an open position.

100. The bag of claim 99, wherein at least one of the male and female profiles further comprise at least a second polymer selected from a polyolefinic resin, an engineering resin, and a combination thereof.

101. The bag of claim 100, wherein the polyolefinic resin is selected from low density polyethylenes, linear low density polyethylenes, high density polyethylenes, medium density polyethylenes, polypropylenes, plastomers, elastomers, ethylene vinyl acetates, ethyl methacrylates, polymethylpentene copolymers, polyisobutylenes, polyolefin ionomers, and combinations thereof.

102. The bag of claim 101, wherein at least one of the male and female profiles further comprise an alkenyl aromatic polymer.

103. The bag of claim 102, wherein the alkenyl aromatic polymer is polystyrene, an ethylene-styrene interpolymer, or a combination thereof.

104. The bag of claim 100, wherein the engineering resin is selected from polycarbonates, polyesters, polyamides, polyacetals, polyacrylates, polysulfones, polyphenylene sulfides, polyphenylene ethers, liquid crystal polymers, and combinations thereof.

105. The bag of claim 100, wherein at least one of the male and female profiles comprise from about 1 to about 99 wt. % of the cyclic olefin copolymer and from about 1 to about 99 wt. % of the second polymer.

106. The bag of claim 105, wherein at least one of the male and female profiles comprise from about 1 to about 40 wt. % of the cyclic olefin copolymer and from about 60 to about 99 wt. % of the second polymer.

107. The bag of claim 99, wherein the cyclic olefin copolymer comprises from about 10 to about 90 mol. % of norbornene.

108. The bag of claim 107, wherein the cyclic olefin copolymer comprises from about 20 to about 70 mol. % of norbornene.

109. The bag of claim 108, wherein the cyclic olefin copolymer comprises from about 35 to about 65 mol. % of norbornene.

110. The bag of claim 99, wherein the glass transition temperature, $T_g$, of the cyclic olefin copolymer is greater than about 50° C. as determined by ASTM D3418.

111. The bag of claim 110, wherein the glass transition temperature, $T_g$, of the cyclic olefin copolymer is greater than about 75° C. as determined by ASTM D3418.

112. The bag of claim 99, wherein at least one of the male and female profiles further comprise a filler selected from clay, talc, mica, calcium carbonate, wood flour, glass sphere, glass fibers, pigments, and nanoclays.

113. The bag of claim 99, wherein the bottom is formed by folding the first and second opposing body panels.

114. The bag of claim 99, wherein the first and second opposing body panels are sealed after being initially separated so as to form the pair of sides and the bottom.

115. The bag of claim 99, wherein the bottom and one of the sides are sealed after initially folding the first and second opposing body panels so as to form a side fold.

116. A polymeric bag comprising:
first and second opposing body panels fixedly connected to each other along a pair of sides and a bottom bridging the pair of sides; and
a reclosable fastener extending along a mouth formed opposite the bottom, the fastener including a pair of interlocking flexible plastic tracks, the plastic tracks including a male track including a male profile and a first fin, the first fin extending from the male profile; and a female track including a female profile and a second fin, the second fin extending from the female profile, at least one of the first and second fins comprising a cyclic olefin copolymer, the cyclic olefin copolymer having a glass transition temperature, $T_g$, of greater than about 20° C. as determined by ASTM D3418.

117. A polymeric bag comprising:

first and second opposing body panels fixedly connected to each other along a pair of sides and a bottom bridging the pair of sides; and a reclosable fastener extending along a mouth formed opposite the bottom, the fastener including a pair of interlocking flexible plastic tracks, the plastic tracks including a male track including a male profile and a first fin, the first fin extending from the male profile; and a female track including a female profile and a second fin, the second fin extending from the female profile, at least one of the male and female profiles comprising a cyclic olefin copolymer, the cyclic olefin copolymer having a glass transition temperature, $T_g$, of greater than about 20° C. as determined by ASTM D3418.

118. A polymeric bag comprising:

first and second opposing body panels fixedly connected to each other along a pair of sides and a bottom bridging the pair of sides;

a reclosable fastener extending along a mouth formed opposite the bottom, the fastener including a pair of interlocking flexible plastic tracks, the plastic tracks including a male track including a male profile, and a female track including a female profile, at least one of the male and female profiles comprising a cyclic olefin copolymer, the cyclic olefin copolymer having a glass transition temperature, $T_g$, of greater than about 20° C. as determined by ASTM D3418; and a slider slidably mounted to the fastener for movement between a closed position and an open position.

119. A polymeric bag comprising:

first and second opposing body panels fixedly connected to each other along a pair of sides and a bottom bridging the pair of sides; and a reclosable fastener extending along a mouth formed opposite the bottom, the fastener including a pair of interlocking flexible plastic tracks, the plastic tracks including a male track including a male profile, and a female track including a female profile, at least one of the male and female profiles comprising a cyclic olefin copolymer, the cyclic olefin copolymer having a glass transition temperature, $T_g$, of greater than about 20° C. as determined by ASTM D3418.

* * * * *